(12) United States Patent
Chowdhry et al.

(10) Patent No.: US 9,317,891 B2
(45) Date of Patent: Apr. 19, 2016

(54) SYSTEMS AND METHODS FOR HARDWARE-ACCELERATED KEY COLOR EXTRACTION

(71) Applicants: Anita Chowdhry, Saratoga, CA (US); Subir Ghosh, San Jose, CA (US)

(72) Inventors: Anita Chowdhry, Saratoga, CA (US); Subir Ghosh, San Jose, CA (US)

(73) Assignee: nComputing, Inc., Santa Clara, CA (US)

( * ) Notice: Subject to any disclaimer, the term of this patent is extended or adjusted under 35 U.S.C. 154(b) by 257 days.

(21) Appl. No.: 13/913,206

(22) Filed: Jun. 7, 2013

(65) Prior Publication Data

US 2014/0362097 A1  Dec. 11, 2014

(51) Int. Cl.
| | |
|---|---|
| G09G 5/36 | (2006.01) |
| G06T 1/60 | (2006.01) |
| G09G 5/393 | (2006.01) |
| G09G 5/39 | (2006.01) |

(52) U.S. Cl.
CPC *G06T 1/60* (2013.01); *G09G 5/393* (2013.01); *G09G 5/39* (2013.01)

(58) Field of Classification Search
CPC .............. G06T 1/60; G09G 5/393; G09G 5/39
See application file for complete search history.

(56) References Cited

U.S. PATENT DOCUMENTS

| | | | |
|---|---|---|---|
| 5,402,147 A | 3/1995 | Chen et al. | |
| 5,844,541 A | 12/1998 | Cahill, III | |
| 5,995,120 A | 11/1999 | Dye | |
| 6,516,283 B2 | 2/2003 | McCall et al. | |
| 6,519,283 B1 | 2/2003 | Cheney et al. | |
| 7,400,328 B1 | 7/2008 | Ye et al. | |
| 7,746,346 B2 | 6/2010 | Woo | |
| 8,896,612 B2 | 11/2014 | Chowdhry et al. | |
| 2002/0183958 A1 | 12/2002 | Mccall et al. | |
| 2005/0088447 A1* | 4/2005 | Hanggie et al. | 345/545 |
| 2007/0182748 A1 | 8/2007 | Woo | |
| 2012/0120320 A1 | 5/2012 | Chowdhry et al. | |
| 2012/0127185 A1* | 5/2012 | Chowdhry et al. | 345/531 |

FOREIGN PATENT DOCUMENTS

WO    WO-2012068242 A1    5/2012

OTHER PUBLICATIONS

U.S. Appl. No. 12/947,294, Examiner Interview Summary mailed Jan. 25, 2013, 3 pgs.
U.S. Appl. No. 12/947,294, Final Office Action mailed May 23, 2013, 24 pgs.
U.S. Appl. No. 12/947,294, Non Final Office Action mailed Aug. 30, 2012, 15 pgs.

(Continued)

*Primary Examiner* — James A Thompson
*Assistant Examiner* — Tapas Mazumder
(74) *Attorney, Agent, or Firm* — Schwegman Lundberg & Woessner, P.A.

(57) ABSTRACT

Systems and methods for hardware-accelerated key color extraction are disclosed. An update corresponding to a portion of a digital representation of a display screen is received. Key color information for locations within the update is identified. A data structure code associated with the portion of the digital representation of the display screen is determined based on the identification of the key color information. The data structure code is provided to a data structure. During a scan of the frame buffer for display, the frame buffer is capable of being read according to the data structure.

32 Claims, 19 Drawing Sheets

(56) References Cited

OTHER PUBLICATIONS

U.S. Appl. No. 12/947,294, Preliminary Amendment filed Nov. 2, 2011, 3 pgs.
U.S. Appl. No. 12/947,294, Preliminary Amendment filed Nov. 10, 2011, 3 pgs.
U.S. Appl. No. 12/947,294, Response filed Nov. 30, 2012 to Non Final Office Action mailed Aug. 30, 2012, 13 pgs.
U.S. Appl. No. 12/947,294, Supplemental Response filed Jan. 25, 2013 to Non Final Office Action mailed Aug. 30, 2012, 15 pgs.
International Application Serial No. PCT/US2011/060982, International Preliminary Report on Patentability mailed May 30, 2013, 7 pgs.
International Application Serial No. PCT/US2011/060982, International Search Report mailed Mar. 19, 2012, 2 pgs.
International Application Serial No. PCT/US2011/060982, Written Opinion mailed Mar. 19, 2012, 5 pgs.
U.S. Appl. No. 12/947,294, Notice of Allowance mailed Oct. 2, 2014, 5 pgs.
U.S. Appl. No. 12/947,294, Response filed Aug. 23, 2013 to Non Final Office Action mailed May 23, 2013, 15 pgs.

* cited by examiner

| | 802 | | | | | | | |
|---|---|---|---|---|---|---|---|---|
| | | 1 | 6 | 1 | | 1 | 6 | 1 |
| | | 1 | 5 | 2 | | 1 | 5 | 2 |
| | | 1 | 4 | 3 | | 1 | 4 | 3 |
| | | 1 | 3 | 4 | | 1 | 3 | 4 |
| | | 1 | 2 | 5 | | 1 | 2 | 5 |
| | | 1 | 1 | 6 | | 1 | 1 | 6 |
| | | 2 | 5 | 1 | | 2 | 5 | 1 |
| | | 2 | 4 | 2 | | 2 | 4 | 2 |
| | | 2 | 3 | 3 | | 2 | 3 | 3 |
| | | 2 | 2 | 4 | | 2 | 2 | 4 |
| HNH | | 2 | 1 | 5 | NHN | 2 | 1 | 5 |
| | | 3 | 4 | 1 | | 3 | 4 | 1 |
| | | 3 | 3 | 2 | | 3 | 3 | 2 |
| | | 3 | 2 | 3 | | 3 | 2 | 3 |
| | | 3 | 1 | 4 | | 3 | 1 | 4 |
| | | 4 | 3 | 1 | | 4 | 3 | 1 |
| | | 4 | 2 | 1 | | 4 | 2 | 1 |
| | | 4 | 1 | 2 | | 4 | 1 | 2 |
| | | 5 | 2 | 1 | | 5 | 2 | 1 |
| | | 5 | 1 | 2 | | 5 | 1 | 2 |
| | | 6 | 1 | 1 | | 6 | 1 | 1 |
| | | 8 | 0 | | | 8 | 0 | |
| | | 7 | 1 | | | 7 | 1 | |
| | | 6 | 2 | | | 6 | 2 | |
| HN | | 5 | 3 | | NH | 5 | 3 | |
| | | 4 | 4 | | | 4 | 4 | |
| | | 3 | 5 | | | 3 | 5 | |
| | | 2 | 6 | | | 2 | 6 | |
| | | 1 | 7 | | | 1 | 7 | |
| NB | | 4 | 4 | | BN | 4 | 4 | |
| HB | | 4 | 4 | | BH | 4 | 4 | |
| ALL D | | | | | | | | |

FIG. 8

SYSTEMS AND METHODS FOR HARDWARE-ACCELERATED KEY COLOR EXTRACTION

RELATED APPLICATION

This application is a continuation in part which claims priority to U.S. application Ser. No. 12/947,294 entitled "System and Method for On-The-Fly Key Color Generation," which was filed on Nov. 16, 2010 and which is incorporated by reference herein in its entirety.

TECHNICAL FIELD

Aspects of the present disclosure relate to the field of digital video and graphics processing. In particular, but not by way of limitation, example embodiments of the present disclosure concern techniques for hardware-accelerated key color extraction.

BACKGROUND

Full-motion video generation systems decode and display full-motion video. In the computer context, full-motion video is the rendering of clips of television programming or film on a computer screen for the user. (This document will use the term 'full-motion video' when referring to such television or film clips to distinguish such full-motion video from the reading of normal desktop graphics for generation of a video signal for display on a video display monitor.) Full-motion video is generally represented in digital form as computer files containing encoded video or an encoded digital video stream received from an external source. To display such full-motion video, the computer system must decode the full-motion video and then merge the full-motion video with video data in the computer system's main frame buffer. Thus, the generation of full-motion video is a memory size and memory bandwidth-intensive task. However, the display of full-motion video is a standard feature that is now expected in all modern computer systems.

In a full personal computer system, there is ample central processing unit (CPU) processing power, memory, and memory bandwidth in order to perform all of the needed functions for rendering a complex composite video display signal. For example, the CPU may decode full-motion video stream, the CPU may render a desktop display screen in a frame buffer, and a video display adapter may then read the decoded full-motion video, combine the decoded full-motion video with the desktop display screen, and render a composite video display signal.

However, in small computer systems, where the computing resources are much more limited, the task of generating a video display can be much more difficult. For example, mobile telephones, handheld computer systems, netbooks, and terminal systems will have much less CPU, memory, and video display adapter resources than a typical personal computer system. Thus, in a small computer the task of rendering a composite video display can be very difficult. It would therefore be desirable to develop methods of improving the display systems for small computer systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 7A-7C illustrate display diagrams of example display screens with a full-motion video window and two other windows overlaid on top of the full-motion video window that partially block the view of the full-motion video window, according to some embodiments.

FIG. 8 illustrates a table containing an example of macro block states that can be represented by a six-bit matrix code, according to some embodiments.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the inventive subject matter disclosed herein. It will be apparent to one skilled in the art that specific details in the example embodiments are not required in order to practice the present inventive subject matter. For example, although an example embodiment is described with reference to thin-client terminal systems, the teachings of this disclosure may be used in any computer system with a digital display. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
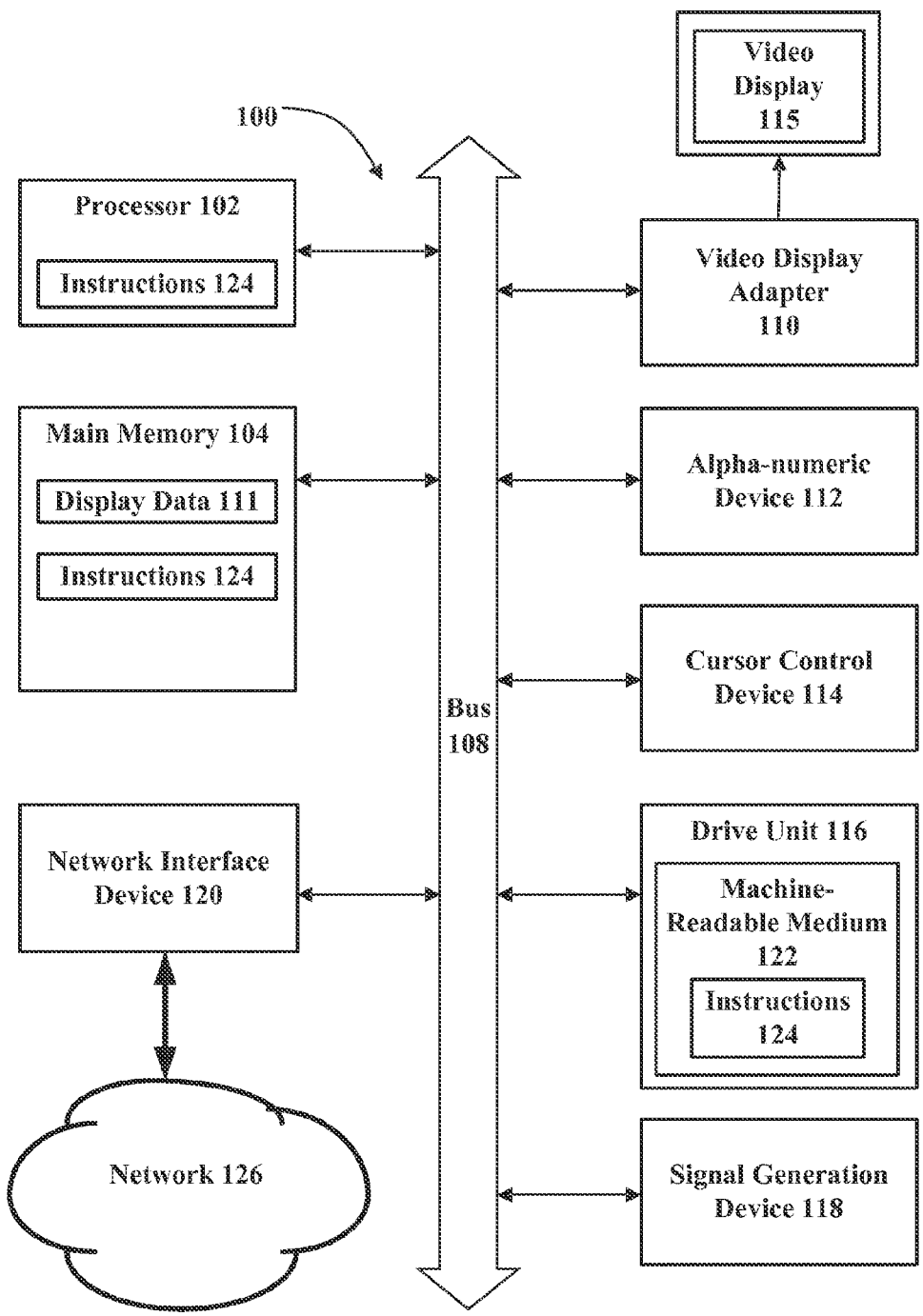
FIG. 1 illustrates a diagrammatic representation of a machine in the example form of a computer system within which a set of instructions, for causing the machine to perform any one or more of the methodologies discussed herein, may be executed.

The present disclosure concerns computer systems. FIG. 1 illustrates a diagrammatic representation of a machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

In many computer systems, a section of the main memory 104 is used to store display data 111 that will be accessed by the video display adapter 110 to generate a video signal. A section of memory that contains a digital representation of what the video display adapter 110 is currently outputting on the video display system 115 is generally referred to as a frame buffer. Some video display adapters store display data in a dedicated frame buffer located separate from the main memory. (For example, a frame buffer may reside within the video display adapter 110.) However, this application will primarily focus on computer systems that store a frame buffer in a shared memory system.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

Some computer systems may operate in a terminal mode wherein the system receives a full representation of display data to be stored in the frame buffer over the network interface device 120. Such computer systems will decode the display data and fill the frame buffer with the decoded display data. The video display adapter 110 will then render the received data on the video display system 115. In addition, a computer system may receive a stream of full-motion video (FMV) for display. The computer system decodes the FMV stream data such that the FMV can be displayed The video display adapter 110 then merges that FMV data with display data in the frame buffer to generate a final display signal for the video display system 115.

In FIG. 1, although the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions 124. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Computer Display Systems

A video display for a computer system is made up of a matrix of individual pixels (picture elements). Each pixel is the individual "dot" on the video display device. The resolution of a video display device is defined as the number of pixels displayed on the video display device. For example, a video display monitor with a resolution of 800×600 will display a total of 480,000 pixels. Most modern computer systems can render video in several different display resolutions such that the computer system can take advantage of the specific resolution capabilities of the particular video display monitor coupled to the computer system.

In a computer system with a color display system, each individual pixel can be any different color that can be generated by the display system. Each individual pixel is represented in the frame buffer of the memory system with a digital value that specifies the pixel's color. The number of different colors that may be represented is limited by the number of bits assigned to each pixel. The number of bits per pixel is often referred to as the color-depth.

A single bit per pixel frame buffer would only be capable of representing black and white. A monochrome display would require a small number of bits to represent various shades of gray. A "High Color" display system is defined as each pixel containing 16 bits of color data where there is with 5 bits of red data, 6 bits of green data, and 5 bits of blue data. "True Color" is defined as each pixel containing 24 bits of data, with 8 bits of Red data, Green data, Blue data (RGB) each. Thus, True Color mode is synonymous with "24-bit" mode, and High Color "16-bit" mode. Due to reduced memory prices and the ability of 24-bit (True Color) to convincingly display any image without much noticeable degradation, most computer systems now use 24 bit "True Color" color. Some video systems may also use more than 24 bits per pixel wherein the extra bits are used to denote levels of transparency such that multiple depths of pixels may be combined.

To display an image on a video display system, the video display adapter of a computer system fetches pixel data from the frame buffer, interprets the color data, and then generates an appropriate display signal that is sent to a display device such as a liquid crystal display (LCD) panel. Only a single frame buffer is required to render a video display. However, more than one frame buffer may be present in a computer system memory depending on the application.

In a personal computer system, the video adapter system may have a separate video frame buffer that is in a dedicated video memory system. The video memory system may be designed specifically for handling the task of display data. Thus, in most personal computers the rendering of a video display can be handled easily. However, in small computer systems such as mobile telephones, handheld computer systems, netbooks, and terminal systems, the computing resources tend to be much more limited. The computing resources may be limited due to cost, battery usage, heat dissipation, and other reasons. Thus, the task of generating a video display in a small computer system can be much more difficult. For example, a small computer system will generally have less CPU power, memory, and video display adapter resources than a personal computer system.

In a small computer system, there is often no separate video memory system. Thus, the video generation system must share the same memory as the rest of the small computer system. Since a video generation system must constantly reads the entire frame buffer at high rate (generally 30 to 60 times per second), the memory bandwidth (the amount of data that can be read out of the memory system per unit time) can become a very scarce resource that limits functionality of the small computer system. Thus, it is important to devise methods of reducing the memory bandwidth requirements of applications within a small computer system.

Thin-Client Terminal System Overview

As set forth above, many different types of computer systems with limited resources may benefit from methods that reduce the memory bandwidth requirements The present application will focus on an implementation within a small computer terminal system known as a thin-client terminal system. A thin-client terminal system is an inexpensive small computer system that is only designed to receive user input, transmit that input to a remote computer system, receive output information from that remote computer system, and present that output information to the user. For example, a thin-client terminal system may transmit mouse movements and keystrokes received from a user to a remote computer system and display video output data received from the remote computer system. No user application programs execute on the processor of a dedicated thin-client terminal system.

Modern thin-client terminal systems strive to provide all of the standard interface features that personal computers provide to their users. For example, modern thin-client terminal systems include high-resolution graphics capabilities, audio output, and cursor control (mouse, trackpad, trackball, etc.) input that personal computer users have become accustomed to using. To implement all of these features, modern thin-client terminal systems have small dedicated computer systems that implement all of the tasks such as decoding and rendering the video display and encoding the user inputs for transmission to the remote computer system.

Note that although the techniques set forth this document will be disclosed with reference to thin-client terminal systems, the techniques described herein are applicable in any other type of small computer system that needs to efficiently use limited computer resources. For example, any other small computer system that renders FMV, such as mobile telephones, netbooks, slate computers, or other small systems, may use the teachings of this document.

An Example Thin-Client System

Figure 2A:
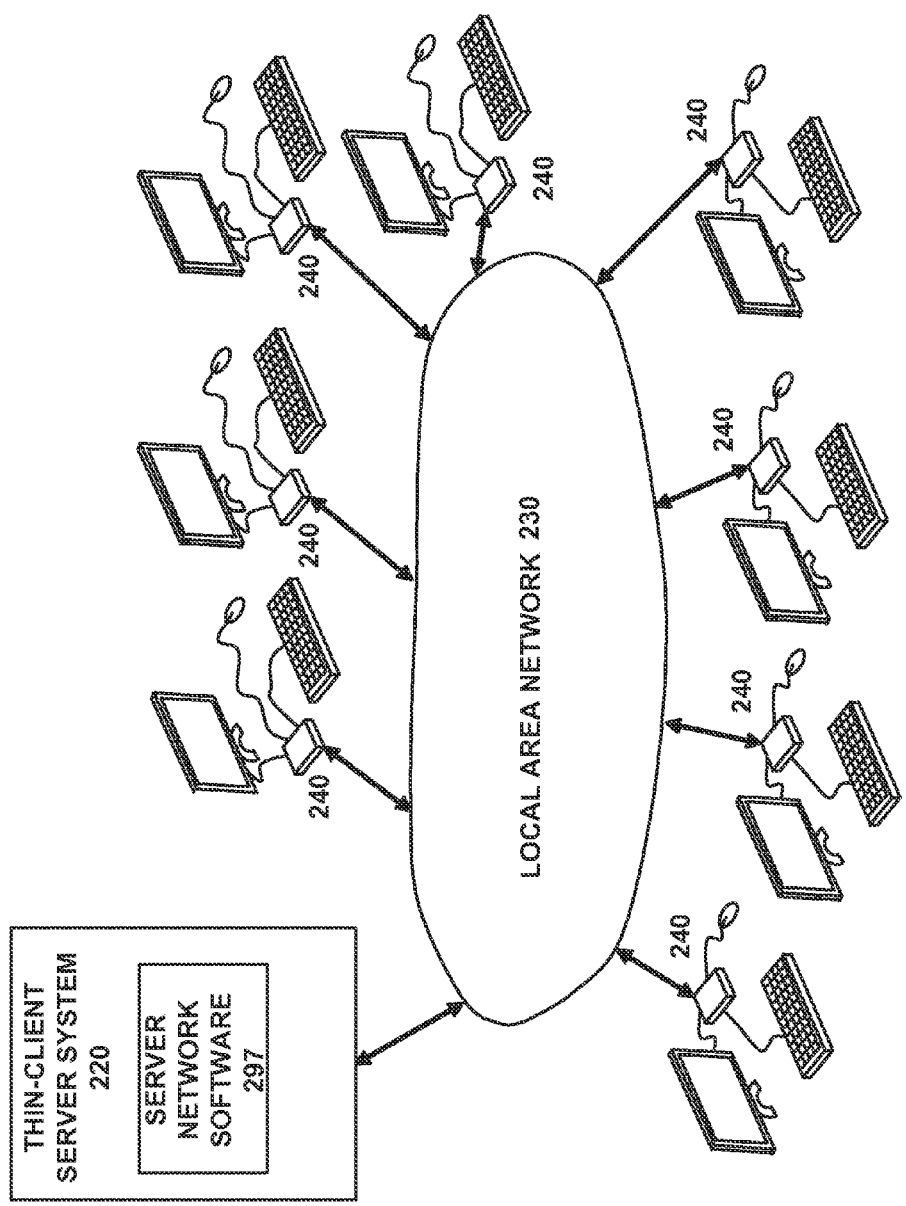
FIG. 2A illustrates a high-level block diagram of an example single thin-client server computer system supporting multiple individual thin-client terminal systems using a local area network, according to some embodiments.

FIG. 2A illustrates a conceptual diagram of a thin-client environment. Referring to FIG. 2A, a single thin-client server computer system 220 provides computer processing resources to many individual thin-client terminal systems 240. Computer applications execute on the server computer system 220 and the thin-client terminal systems 240 are used for displaying output and receiving user input.

In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server computer system 220 and the thin-client server computer system 220 transmits output information (such as video and audio) across the local area network 230 to the individual thin-client terminal systems 240. The individual thin-client terminal systems 240 are served using thin-client server network software 297 running on thin-client server computer system 220.

Figure 2B:
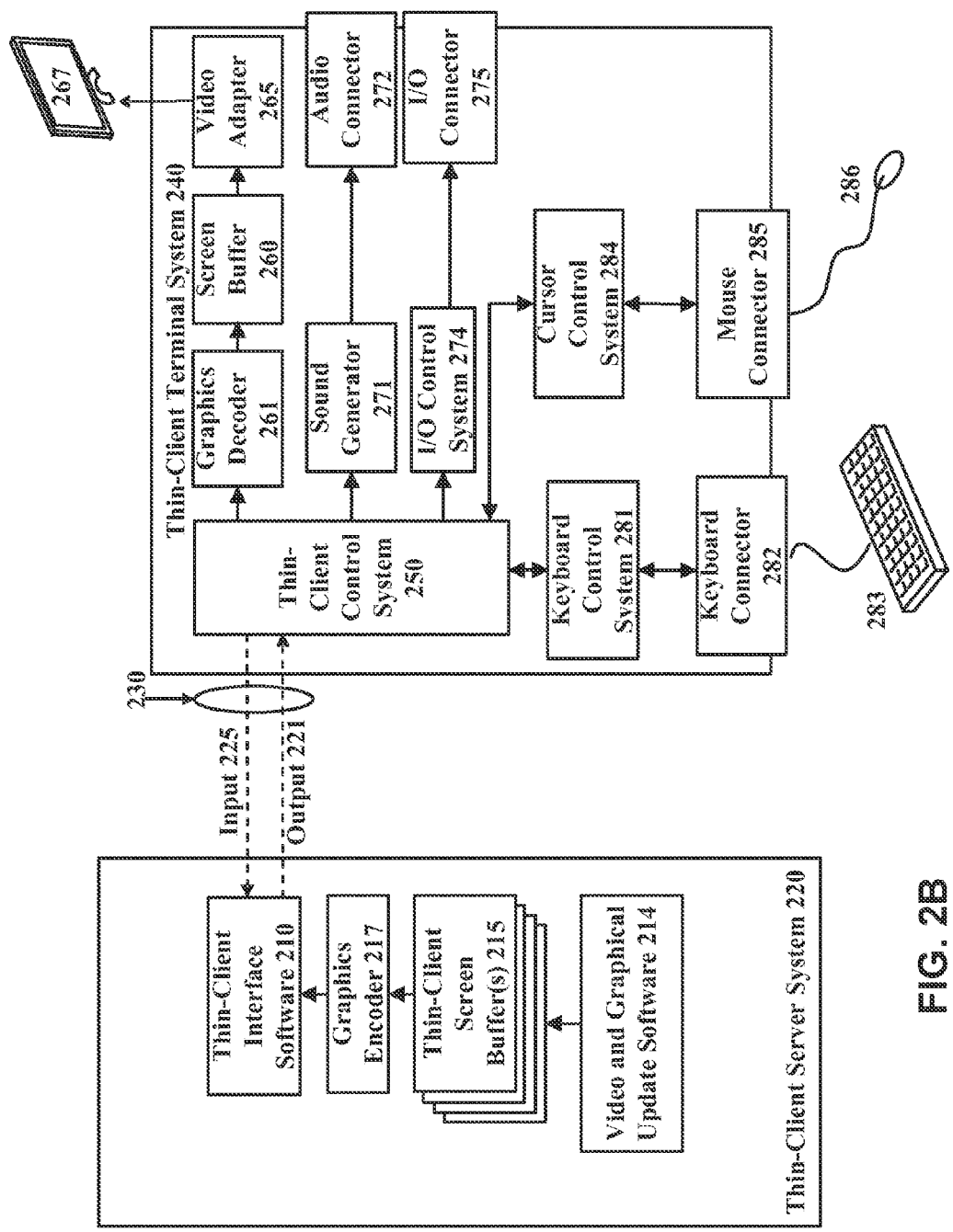
FIG. 2B illustrates a block diagram of an example thin-client terminal system coupled to a thin-client server computer system, according to some embodiments.

FIG. 2B illustrates a block diagram of a basic embodiment of a thin-client server computer system 220 coupled to one (of possibly many) thin-client terminal system 240. The thin-client server computer system 220 and thin-client terminal system 240 are coupled with a bi-directional digital communications channel 230 that may be a serial data connection, an Ethernet connection, or any other suitable bi-directional digital communication means such as the local area network 230 of FIG. 2A.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead of the inexpensive thin-client terminal system 240. Keeping the costs low can be achieved since the thin-client terminal system 240 will not need the full computing resources or software of a personal computer system. Those features will be provided by the thin-client server computer system 220 that will interact with the thin-client terminal system 240.

Referring back to FIG. 2B, the thin-client terminal system 240 provides both visual and auditory output using a high-resolution video display system and an audio output system. The high-resolution video display system consists of a graphics update decoder 261, a frame buffer or a screen buffer 260, and a video adapter 265. When changes are made to a representation of a terminal's display in thin-client screen buffer 215 within the server computer system 220, a graphics encoder 217 identifies those changes in the thin-client screen buffer 215, encodes the changes, and then transmits the changes to the thin-client terminal system 240. In an example embodiment, the graphics encoder 217 may be a Joint Photographic Experts Group ("JPEG") encoder.

Within the thin-client terminal system 240, the graphics update decoder 261 decodes graphical changes made to the associated thin-client screen buffer 215 in the server computer system 220 and applies those same changes to the local screen buffer 260, thus making screen buffer 260 an identical copy of the bit-mapped display information in thin-client screen buffer 215. Video adapter 265 reads the video display information out of screen buffer 260 and generates a video display signal to drive display system 267.

The audio sound system of thin-client terminal system 240 operates in a similar manner. The audio system consists of a sound generator 271 for creating a sound signal coupled to an audio connector 272. The sound generator 271 is supplied with audio information from thin-client control system 250 using audio information sent as output 221 by the thin-client server computer system 220 across bi-directional communications channel 230.

From an input perspective, thin-client terminal system 240 allows a terminal system user to enter both alpha-numeric (keyboard) input and cursor control device (mouse) input that will be transmitted to the thin-client server computer system 220. The alpha-numeric input is provided by a keyboard 283 coupled to a keyboard connector 282 that supplies signals to a keyboard control system 281. The thin-client control system 250 encodes keyboard input from the keyboard control system 281 and sends that keyboard input as input 225 to the thin-client server computer system 220. Similarly, the thin-client control system 250 encodes cursor control device input from cursor control system 284 and sends that cursor control input as input 225 to the thin-client server computer system 220. The cursor control input is received through a mouse connector 285 from a computer mouse 286 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2B includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client terminal systems 240. As illustrated in FIG. 2B, thin-client interface software 210 in thin-client server computer system 220 supports the thin-client terminal system 240 as well as any other thin-client terminal systems coupled to thin-client server computer system 220. The thin-client server computer system 220 keeps track of the state of each thin-client terminal system 240 by maintaining a thin-client screen buffer 215 in the thin-client server computer system 220 for each thin-client terminal system 240. The thin-client screen buffer 215 in the thin-client server computer system 220 contains a representation of what is displayed on the associated thin-client terminal system 240.

Transporting Video Information to Terminal Systems

The bandwidth required to transmit an entire high-resolution video frame buffer from a server to a terminal at full refresh speeds is prohibitively large. Thus video compression systems are used to greatly reduce the amount of information needed to recreate a video display on a terminal system at a remote location. In an environment that uses a shared communication channel to transport the video display information (such as the computer network based thin-client environment of FIG. 2B), large amounts of display information transmitted to each thin-client terminal system 240 can adversely impact the local area network 230. If the video display information is not encoded efficiently enough, the large amount of display information may overwhelm the network 230 thus not allowing the system to function at all.

When the applications running on the thin-client server computer system 220 are typical office software applications (such as word processors, databases, spreadsheets, etc.), some simple techniques can be used to significantly decrease the amount of display information that is to be delivered over the network 230 to the thin-client terminal systems 240 while maintaining a quality user experience for each terminal system user. For example, the thin-client server computer system 220 may only send display information across the network 230 to a thin-client terminal system 240 when the display information in the thin-client screen buffer 215 for that specific thin-client terminal system 240 actually changes. In this manner, when the display for a thin-client terminal system is static (e.g., no changes are being made to the thin-client screen buffer 215 in the thin-client server computer system 220), then no display information needs to be transmitted from the thin-client server computer system 220 to that thin-client terminal system 240. Small changes (such as a few words being added to a document in a word processor or the pointer being moved around the screen) will only require small updates to be transmitted.

As long as the software applications run by the users of thin-client terminal systems 240 do not change the display screen information very frequently, then the thin-client system illustrated in FIGS. 2A and 2B will work adequately. However, if some thin-client terminal system users run software applications that rapidly change the thin-client terminal's display screen (such as viewing FMV), the volume of network traffic over the network 230 will increase greatly due to the much larger amounts of graphical update messages that must be transmitted. If several thin-client terminal system 240 users run applications that display FMV, then the bandwidth requirements for the communication channel 230 can become quite formidable such that data packets may be dropped. Dropped packets will greatly decrease the user experience.

To create a more efficient system for handling FMV in a thin-client environment, an improved full-motion system was disclosed in the related United States Patent Application titled "System And Method For Low Bandwidth Display Information Transport" having Ser. No. 12/395,152, filed Feb. 27, 2009, which is hereby incorporated by reference in its entirety. That disclosed system transmits FMV information to be displayed on a thin-client terminal system in an efficiently compressed format. The thin-client terminal system then decodes the compressed FMV to display the FMV locally. An example of this efficient system for transmitting FMV is illustrated in FIG. 3.

Figure 3:
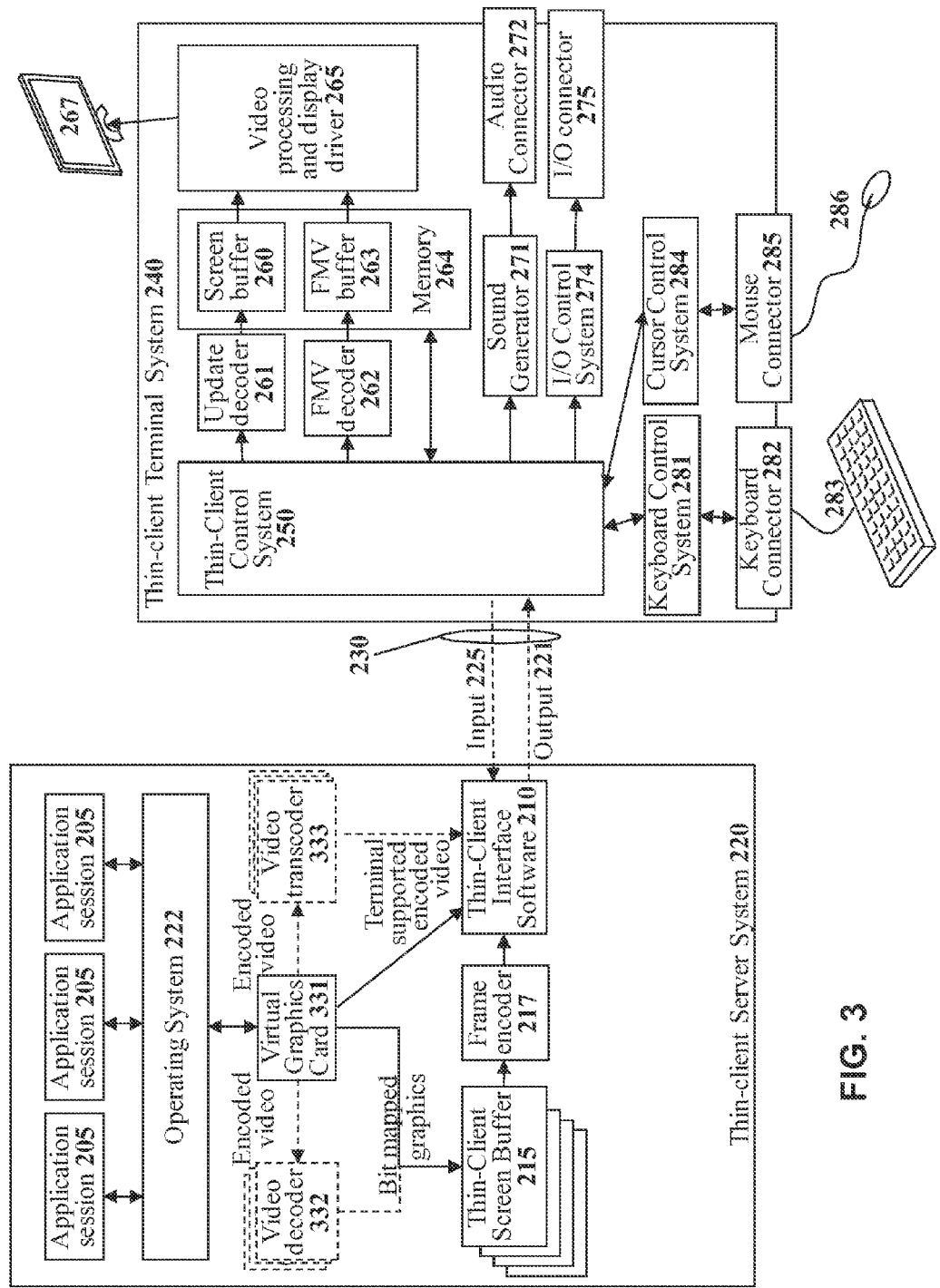
FIG. 3 illustrates a block diagram of an example thin-client server computer system and thin-client terminal system that support a higher quality video stream decoded locally within the thin-client terminal system, according to some embodiments.

Referring to FIG. 3, a thin-client server computer system 220 and a thin-client terminal system 240 are displayed. The thin-client terminal system 240 of FIG. 3 is similar to the thin-client terminal system 240 of FIG. 2B with the addition of a FMV decoder 262. The FMV decoder 262 may receive a FMV stream from thin-client control system 250, decode the FMV stream, and render the decoded video frames in a FMV buffer 263 in a shared memory system 264. The shared memory system 264 may be used for many different memory tasks within thin-client terminal system 240. In the example of FIG. 3, the shared memory system 264 is used to store information for a display screen buffer 260, a decoded FMV buffer 263, and other digital information from the thin-client control system 250.

The FMV decoder 262 may be implemented with software running on a processor, as a discrete off-the-shelf hardware part, as a digital circuit implemented with an Application Specific Integrated Circuit (ASIC), as a Field Programmable Gate Array, or in any other suitable method. In one embodiment, the FMV decoder 262 was implemented as a part of an Application Specific Integrated Circuit since several other portions of the thin-client terminal system 240 could also be implemented within the same ASIC device.

The video transmission system in the thin-client server computer system 220 of FIG. 3 must also be modified in order to transmit encoded FMV streams directly to the thin-client terminal system 240. Referring to the thin-client server computer system 220 of FIG. 3, the video system may include a virtual graphics card 331, thin-client screen buffers 215, and graphics encoder 217. Note that FIG. 3 illustrates other elements that may also be included such as FMV decoders 332 and FMV transcoders 333. For more information on those elements, the reader should refer to the related US Patent application titled "System And Method For Low Bandwidth Display Information Transport" having Ser. No. 12/395,152, filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 that is supported by the thin-client server computer system 220. The goal of the virtual graphics card 331 is to output either bit-mapped graphics to be placed into the appropriate thin-client screen buffer 215 for a thin-client terminal system 240 or to output an encoded FMV stream that is supported by the FMV decoder 262 within the thin-client terminal system 240.

The FMV decoders 332 and FMV transcoders 333 within the thin-client server computer system 220 may be used to support the virtual graphics card 331 in handling FMV streams. Specifically, the FMV decoders 332 and FMV transcoders 333 help the virtual graphics card 331 handle encoded FMV streams that are not natively supported by the FMV decoder 262 in thin-client terminal system 240. The FMV decoders 332 are used to decode FMV streams and place the video data thin-client screen buffer 215 (in the same manner as the system of FIG. 2B). The FMV transcoders 333 are used to convert from a first digital FMV encoding format into a second digital FMV encoding format that is natively supported by FMV decoder 262 in the target thin-client terminal system 240.

The FMV transcoders 333 may be implemented as the combination of a digital FMV decoder for decoding a first digital video stream into individual decoded video frames, a frame buffer memory space for storing decoded video frames, and a digital FMV encoder for re-encoding the decoded video frames into a second digital FMV format supported by the target thin-client terminal system 240. This enables the transcoders 333 to use existing FMV decoders on the personal computer system. Furthermore, the transcoders 333 could share the same FMV decoding software used to implement FMV decoders 332. Sharing code would reduce licensing fees.

The final output of the video system in the thin-client server computer system 220 of FIG. 2B is either graphics update messages from the graphics encoder 217 or an encoded FMV stream that is supported by the target thin-client terminal system 240. The thin-client interface software 210 outputs the graphics update messages and FMV stream information across communication channel 230 to the target thin-client terminal system 240.

In the thin-client terminal system 240, the thin-client control system 250 will distribute the incoming output information (such as audio information, frame buffer graphics, and FMV streams) to the appropriate subsystem within the thin-client terminal system 240. Thus, graphical frame buffer update messages will be passed to the graphics update decoder 261 and the streaming FMV information will be passed to the FMV decoder 262. The graphics update decoder 261 decodes the graphical frame buffer update messages and then applies the graphics update to the thin-client terminal's screen buffer 260. Similarly, the FMV decoder 262 will decode the incoming digital FMV stream and write the decoded video frames into the FMV buffer 263. As illustrated in FIG. 3, the terminal's screen buffer 260 and the FMV buffer 263 reside in the same shared memory system 264. The video processing and video adapter 265 then reads all of the display information out of the terminal's screen buffer 260 and combines it with FMV information read from the FMV buffer 263 to render a final output display signal for display system 267. Thus, to handle the display of video output, the shared memory system 264 must receive updates from the graphics update decoder 261, receives decoded video frames from the FMV decoder 262, and outputs both frame buffer and FMV frames to the video processing and video adapter 265. In addition, the shared memory system 264 must support other memory users such as a network interface and user interface.

Figure 4A:
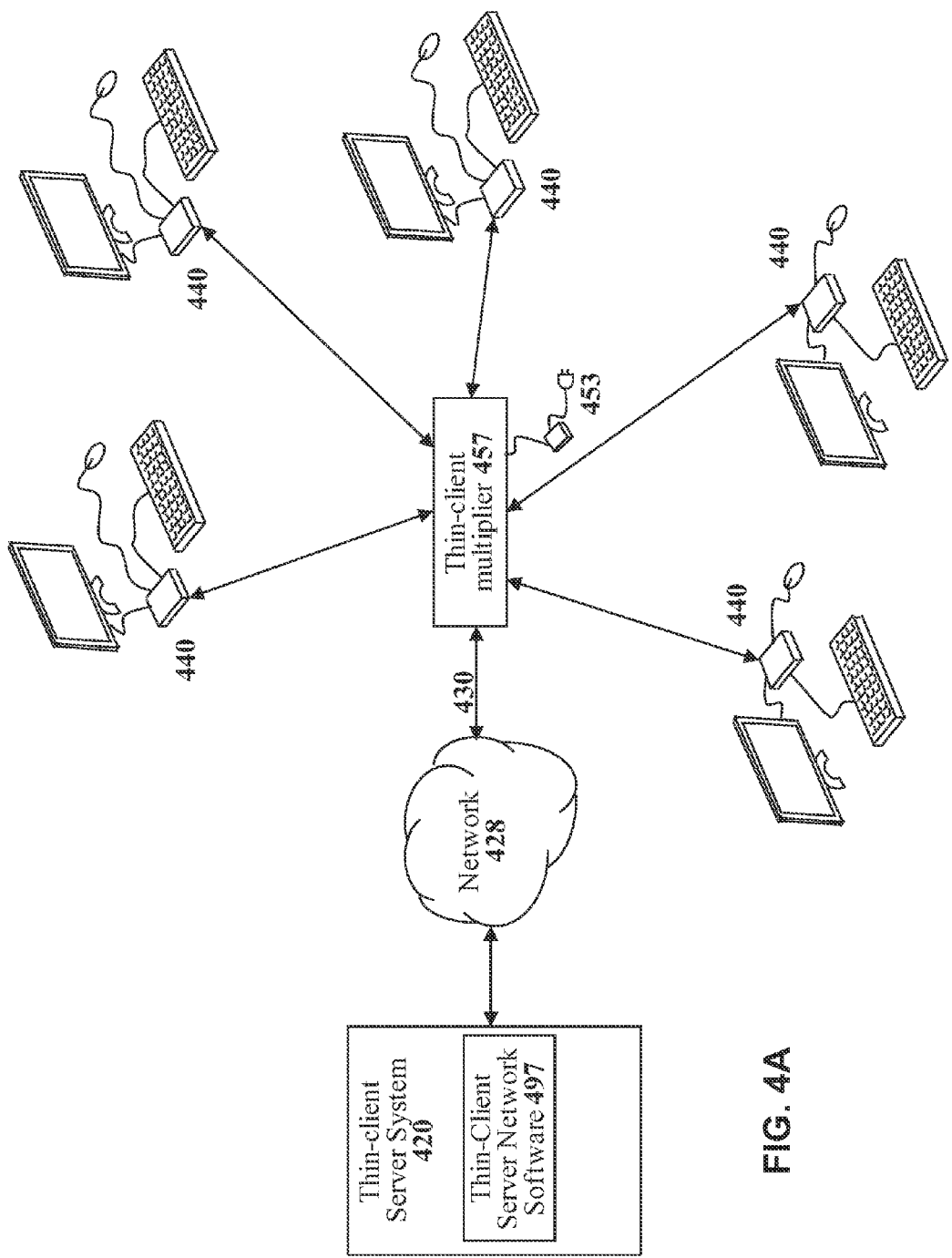
FIG. 4A illustrates a block diagram of three example thin-client terminal systems coupled to a thin-client server system using a thin-client multiplier device, according to some embodiments.

In a system that supports multiple users, the memory bandwidth probably will become even more acute. FIG. 4A illustrates a thin-client terminal environment wherein a thin-client server system 420 is coupled through a network 428 to a thin-client multiplier 457 that serves five different thin-client terminal systems 440. In one embodiment, the thin-client multiplier 457 is a small computer system constructed with an Application Specific Integrated Circuit (ASIC) that outputs video signals for the three different thin-client terminal systems 440 using a shared memory system.

Figure 4B:
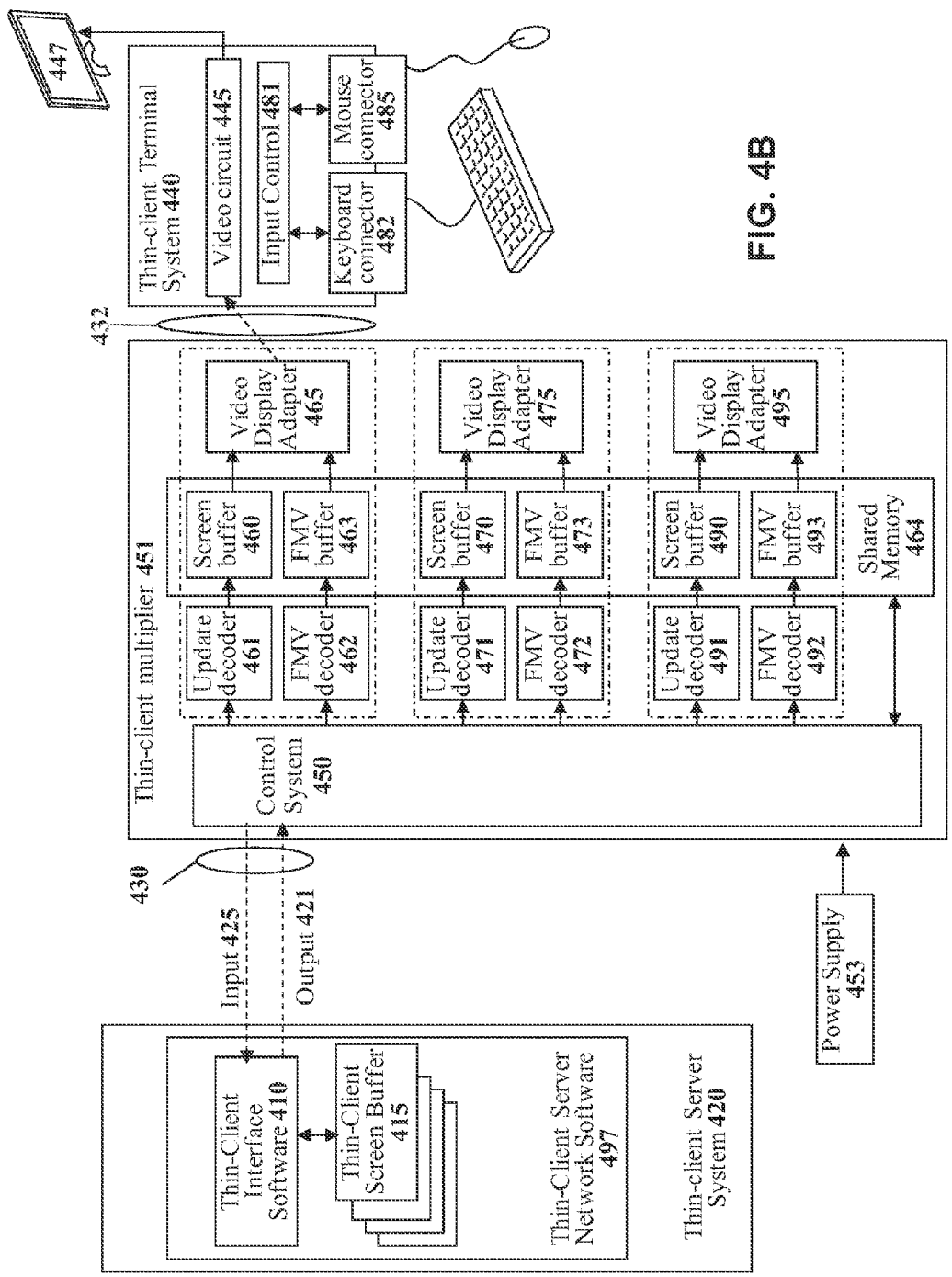
FIG. 4B illustrates a block diagram of an example thin-client multiplier device that may support up to three thin-client terminal systems, according to some embodiments.

FIG. 4B illustrates a block diagram of the video display circuitry for a thin-client multiplier 451 that serves three different thin-client terminal systems 440 using a single shared memory system 464. (Note that for clarity, FIG. 4B only displays one of the three thin-client terminal systems 440 and does not display circuitry for handling terminal input data.) The single shared memory system 464 in the thin-client multiplier 451 handles all the incoming video display data for three screen buffers (460, 470, and 490) and three FMV buffers (463, 473, and 493). Similarly, there are three video display adapters (465, 475, and 495) for reading display data out the screen buffers (460, 470, and 490) and FMV buffers (463, 473, and 493) in order to generate video output signals to drive associated thin-client terminal systems 440. All of this video display activity will greatly stress the memory bandwidth limitations of the shared memory system 464.

Processing of Frame Buffer Graphics

In the thin-client environments of FIGS. 2A, 2B, and 3, the thin-client server computer system 220 may transmit graphics data to the thin-client terminal system 240 over a network. In some embodiments, the graphics data transmitted may be such that the contents of the frame buffer of the thin-client terminal system 240 include a group of rectangular regions that are combined to create a full display screen. Sections of the frame buffer may be encoded in any suitable manner. In some embodiments, the frame buffer may be encoded as rectangular regions that represent portions of the full display screen, which may provide greater efficiency in data transfer from the thin-client server computer system 220 to the thin-client terminal system 240. Specifically, referring to FIG. 3, the frame encoder 217 in the server system 220 may encode sections of the thin-client screen buffer 215 as rectangular regions that are transmitted to the associated thin-client terminal system 240. Each rectangular region may be referred to as a "macro block" having a size that is a particular number of pixels wide and a particular number of pixels high (e.g., 8 pixels wide by 8 pixels high). For explanatory purposes, the examples described throughout the description may include an implementation using 8-pixel by 8-pixel macro blocks. However, one of ordinary skill in the art will recognize that a macro block of any suitable size may be used.

The task of combining a typical display frame buffer with FMV data may be performed in many different ways. One technique is to place a designated "key color" in the section of the frame buffer where the FMV is to be displayed. A video output system, such as the video processing and video adapter 265 of FIG. 3, may then replace the key color areas of the frame buffer with FMV data.

A video output system in a computer system reads pixel information from a frame buffer to generate a video output signal. In addition, a FMV may also be displayed. Reading from both the frame buffer and the FMV buffer when displaying the FMV window may waste valuable memory bandwidth, especially for a thin-client system with a limited amount of computing resources, since some of the data that is read may be immediately discarded. This may be an additional concern when both the frame buffer and the FMV buffer reside within the same shared memory system. To create a more efficient system for handling FMV in a thin-client environment, an improved full-motion system was disclosed in the related United States Patent Application entitled "System and Method for On-The-Fly Key Color Generation" having Ser. No. 12/947,294, filed Nov. 16, 2010, which is hereby incorporated by reference in its entirety. That disclosed system identifies where the video output system should read from the frame buffer and where it should read from the FMV buffer while minimizing the amount of area it reads from both the frame buffer and the full-motion video buffer.

To use the memory bandwidth resources of the computer system more efficiently, the video output system may take advantage of the spatial mutual exclusivity between the display of frame buffer information and the display of FMV information. Specifically, the video output system may avoid unnecessarily reading key color data within FMV window areas since that key color may be immediately discarded. The video output system may create a representation of the frame buffer in a memory space (e.g., on-chip random access memory (RAM)) of the video output system. In some embodiments, the representation of the frame buffer in the memory space may be in the form of any suitable data structure, such as a matrix. The matrix may contain information about which areas of the frame buffer contain key color data, or hue data, where video data for those areas may be pulled from the FMV buffer, and areas of the frame buffer containing no key color data, or non-hue data, where non-video display data for those areas may be pulled from the frame buffer. In some embodiments, the logic that writes the frame buffer information to the frame buffer may also populate the hue matrix with hue and non-hue data to make the data structure representation of the frame buffer in the video output system.

A set of one or more contiguous macro blocks in the frame buffer may be represented by a data field in the matrix. The set of macro blocks may include any suitable number of contiguous macro blocks. For example, the set of macro blocks may include four contiguous macro blocks. For explanatory purposes, the examples described throughout the description may include an implementation using four contiguous macro blocks in a set that is represented by a data field in the matrix. However, one of ordinary skill in the art will recognize that any number of macro blocks may be in a set of macro blocks represented by the data field in the matrix.

Figure 5A:
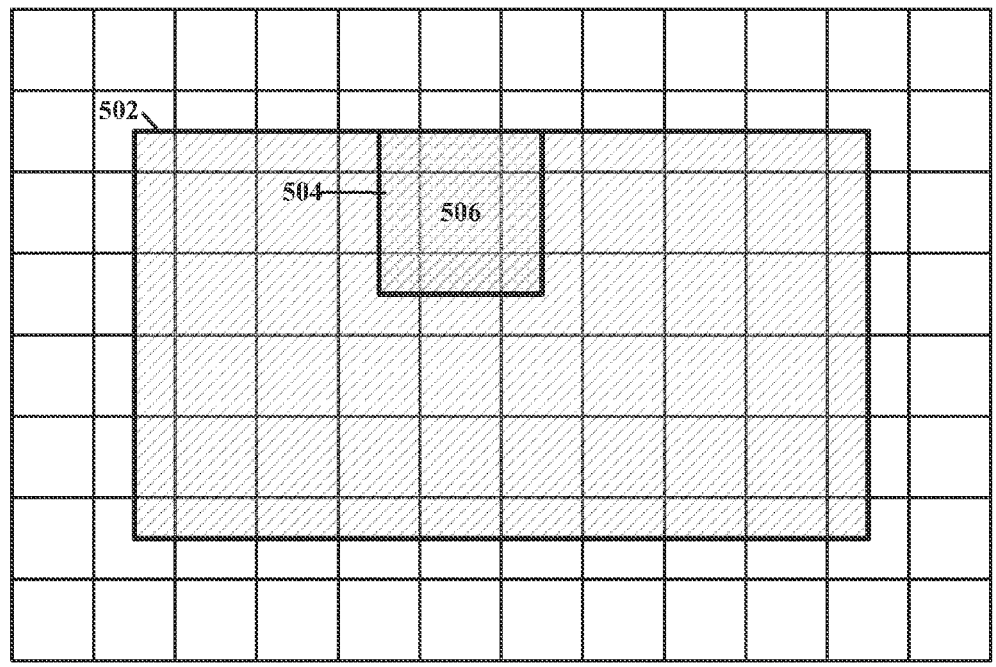
FIGS. 5A-5C illustrate display diagrams of example display screens with a full-motion video window and another window overlaid on top of the full-motion video window that partially blocks the view of the full-motion video window, according to some embodiments.
Figure 5B:
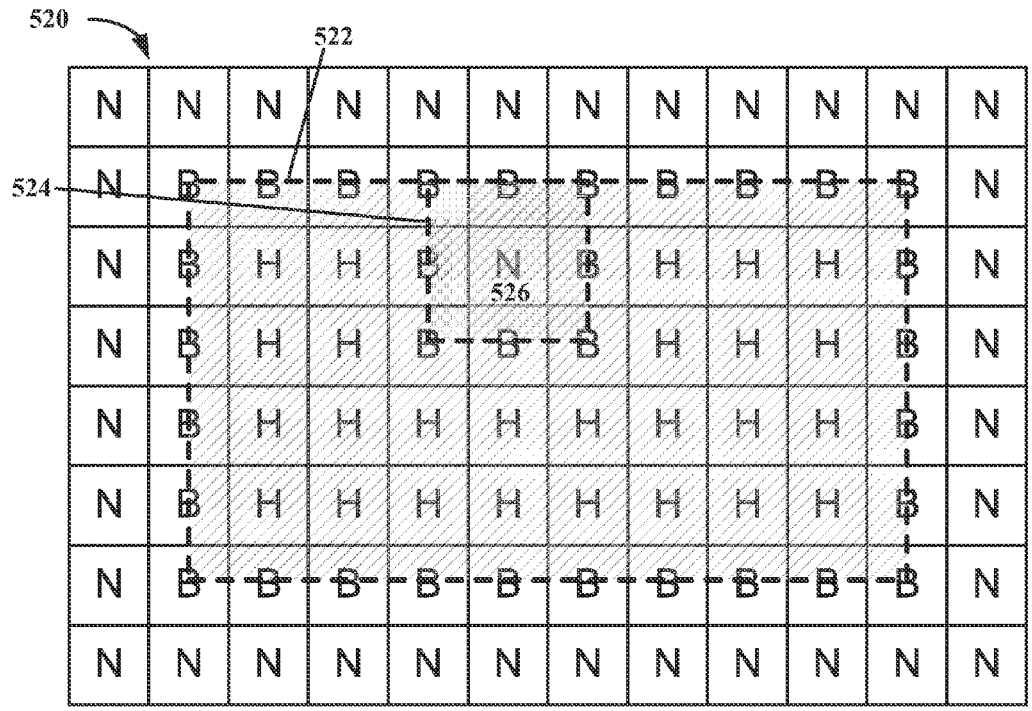
Figure 5C:
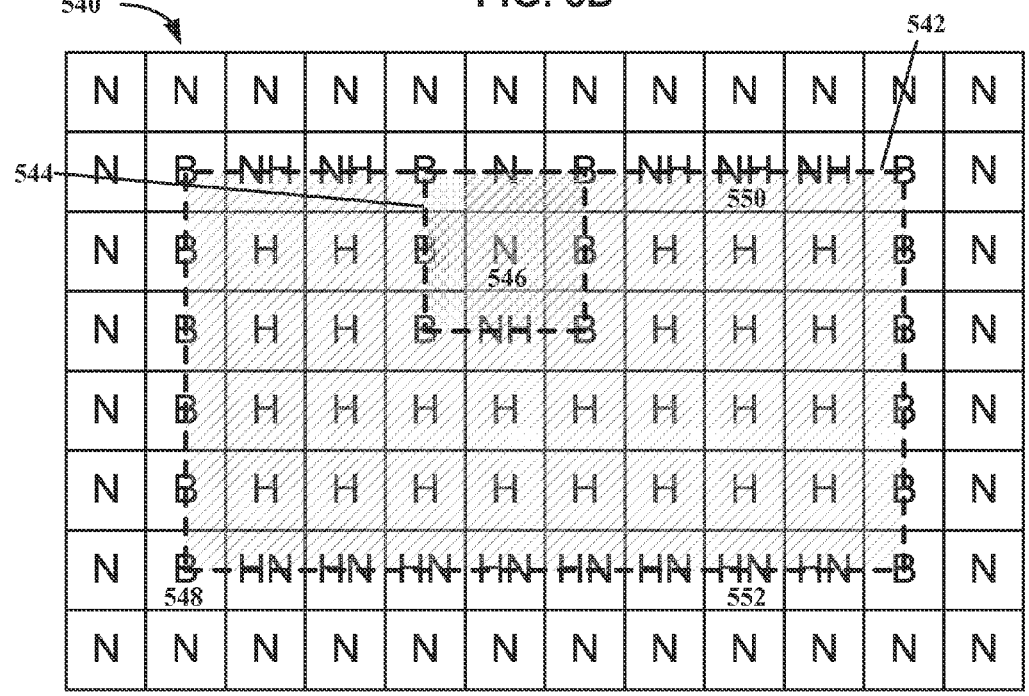

FIGS. 5A-5C illustrate display diagrams of example display screens with a FMV window and another window overlaid on top of the FMV window that partially blocks the view of the FMV window. While one FMV window and one overlay window are shown in FIGS. 5A-5C, one of ordinary skill in the art will recognize that the techniques disclosed herein may be used for any number of FMV windows and/or overlay windows. Referring to FIG. 5A, the display screen 500 may be divided into macro block sets (e.g., macro block set 506) containing four 8-pixel by 8-pixel macro blocks and may include a FMV window 502 for displaying a FMV using data from the FMV buffer and an overlay window 504 overlaid on top of the FMV window 502. The display screen 500 and the overlay window 504 may be windows that are displayed using data from the frame buffer.

To more efficiently read from both the frame buffer and the FMV buffer, a data structure in the form of a matrix may be created which may contain information about which portions of the frame buffer have key color data (e.g., hue data indicating a FMV portion) and which portions of the frame buffer do not contain key color data (e.g., non-hue data indicating a non-video portion). In some embodiments, one bit of data may be used in a data field of the matrix to represent a macro block set in one of two possible states representing either hue or non-hue data. In other embodiments, a macro block set may be represented by two bits of data in the data field of the matrix, where the two bits may denote one of four possible states for the macro block set (e.g., "10" for hue (H), "01" for non-hue (N), "11" for both hue and non-hue (B), or "00" for a sniff state indicating the hue data may need to be determined from the frame buffer). As an example, for a resolution of 1920 pixels by 1080 pixels, there are 135 rows with 240 8-pixel by 8-pixel macro blocks in each row. Each of the 135 rows may be divided into 60 sets of macro blocks, where each set contains four macro blocks. If each macro block set is represented by two bits of data in a data field of the matrix, a 120×135 matrix may be used to represent a frame of display data.

FIG. 5B illustrates an example of how the macro block sets of the display screen 500 of FIG. 5A may each be represented by two bits of data in a data field of the matrix. For example, the macro block sets of the display screen 520 that do not contain any portion of the FMV window 522 contain non-hue (N) data indicating that the frame buffer may be read for these macro block sets. For the N macro block sets, the corresponding data fields in the matrix may include a two-bit code indicating the non-hue (N) data (e.g., "01"). Additionally, for macro block sets that consist entirely of the overlay window 524 without any FMV, such as macro block set 526, the matrix data field corresponding to that macro block set may also include a two-bit code indicating the non-hue (N) data.

The macro block sets within the FMV window 522 consist entirely of FMV contain hue (H) data, indicating that the FMV buffer is to be read for these macro block sets. For the H macro block sets, the corresponding data fields in the matrix may include a two-bit code indicating the hue (H) data (e.g., "10").

In some instances, the hue areas may not necessarily fall on a particular macro block set boundary, and a "fuzzy" boundary may result, where both the frame buffer and the FMV buffer may be pulled from memory. The macro block sets consisting of both hue and non-hue data (B) are typically macro block sets through which a window border may be found. In these cases, both the frame buffer and the FMV buffer are to be read. For the B macro block sets, the corresponding data fields in the matrix may include a two-bit code indicating both the hue and non-hue (B) data (e.g., "11"), such as is shown for macro block sets containing the FMV window 522 borders and the overlay window 524 borders in FIG. 5B.

As described above, a fuzzy area in the hue matrix may represent the macro block sets that should be pulled from both the frame buffer and the FMV buffer. However, reading from both the frame buffer and the FMV buffer may cause peak bandwidth issues. To accommodate a fuzzy area and minimize any peak bandwidth issues, additional data bits per macro block set may be used to more accurately specify where the row boundaries may be located within the macro block set (e.g., which portions of the macro block set should be pulled from the frame buffer and which portions should be pulled from the FMV buffer). For example, a macro block set consisting of four contiguous 8-pixel by 8-pixel macro blocks may contain a horizontal window border such that the macro block set may consist of hue and non-hue data. A six-bit code may be used to represent the macro block set in a data field of the matrix such that the horizontal window border may be more accurately defined within the macro block set (e.g., the six-bit code may be used to indicate in which pixel row a boundary may be located within a macro block set). The six bits of data may define up to 64 states each indicating whether the macro block set is all hue, all non-hue, or a specific combination of hue and non-hue. For example, the horizontal window border may be located in the middle of the macro block set such that the first four rows of the macro block set contain non-hue (N) data and the last four rows of the macro block set contain hue (H) data. In this case, the macro block set may be represented by a six-bit "NH" code.

In some embodiments, the frame buffer is scanned in a manner that corresponds to moving across a display screen from left to right, starting at the top of the display screen. In some embodiments, the left-to-right scanning across the display screen may include scanning macro block rows from left to right. In such embodiments, macro block sets containing vertical window borders (which may also include corners of windows) may be read from both the frame buffer and the FMV buffer.

FIG. 5C illustrates an example of how the macro block sets of the display screen 500 of FIG. 5A may each be represented by six bits of data in a data field of the matrix. For example, the macro block sets of the display screen 540 that do not contain any portions of the FMV window 542 contain non-hue (N) data indicating that the frame buffer may be read for these macro block sets. For the N macro block sets, the corresponding data fields in the matrix may include a six-bit code indicating the non-hue (N) data. Additionally, for macro block sets that consist entirely of the overlay window 544 without any FMV, such as macro block set 546, the matrix data fields corresponding to those macro block sets may also include a six-bit code indicating the non-hue (N) data.

The macro block sets within the FMV window 542 consist entirely of FMV contain hue (H) data, indicating that the FMV buffer is to be read for these macro block sets. For the H macro block sets, the corresponding data fields in the matrix may include a six-bit code indicating the hue (H) data.

The macro block sets containing vertical window borders, such as macro block set 548, contain both hue and non-hue data (B), indicating that both the frame buffer and the FMV buffer are to be read for these macro block sets. For the B macro block sets, the corresponding data fields in the matrix may include a six-bit code indicating both the hue and non-hue data (B).

The macro block sets containing horizontal window borders, such as macro block sets 550 and 552, contain both hue and non-hue data that may be defined based on the hue and non-hue locations within the macro block sets. For example, the top horizontal border of FMV window 542 is located in the middle of macro block set 550. In this case, the first four rows of macro block set 550 contain non-hue (N) data, and the last four rows of macro block set 550 contain hue (H) data. As such, the data field in the matrix corresponding to macro block set 550 may include a six-bit code indicating the "NH" data.

In another example, the bottom horizontal border of FMV window 542 is located in the middle of macro block set 552. In this case, the first four rows of macro block set 552 contain hue (H) data, and the last four rows of macro block set 552 contain non-hue (N) data. As such, the data field in the matrix corresponding to the macro block set 552 may include a six-bit code indicating the "HN" data.

Figure 6A:
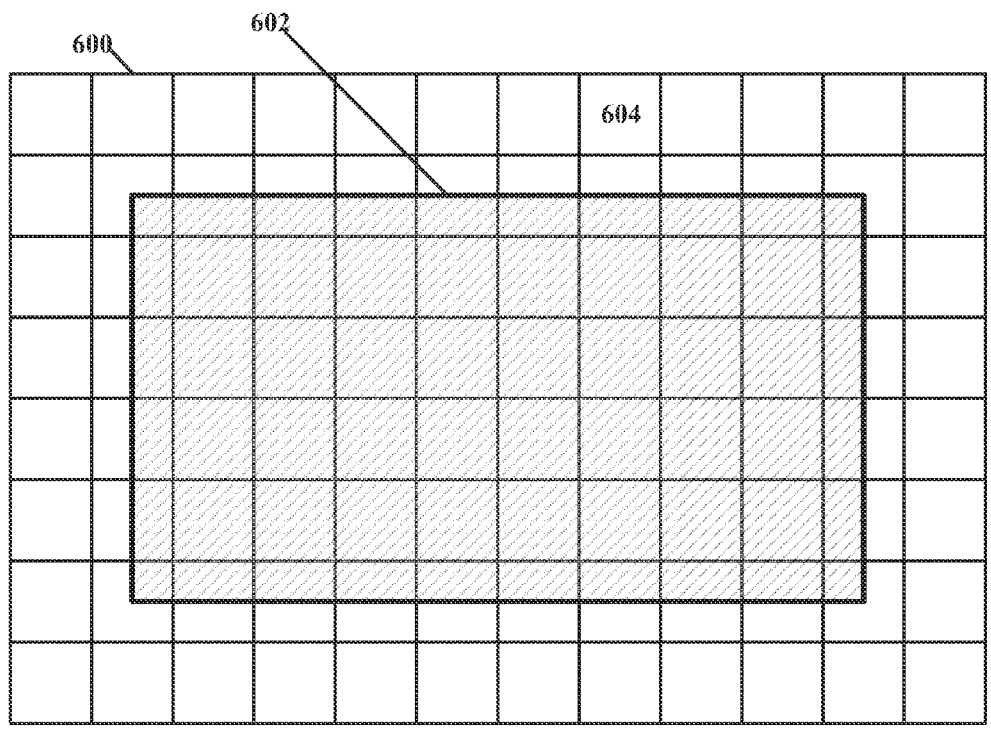
FIGS. 6A-6C illustrate display diagrams of example display screens with a full-motion video wireframe, according to some embodiments.
Figure 6B:
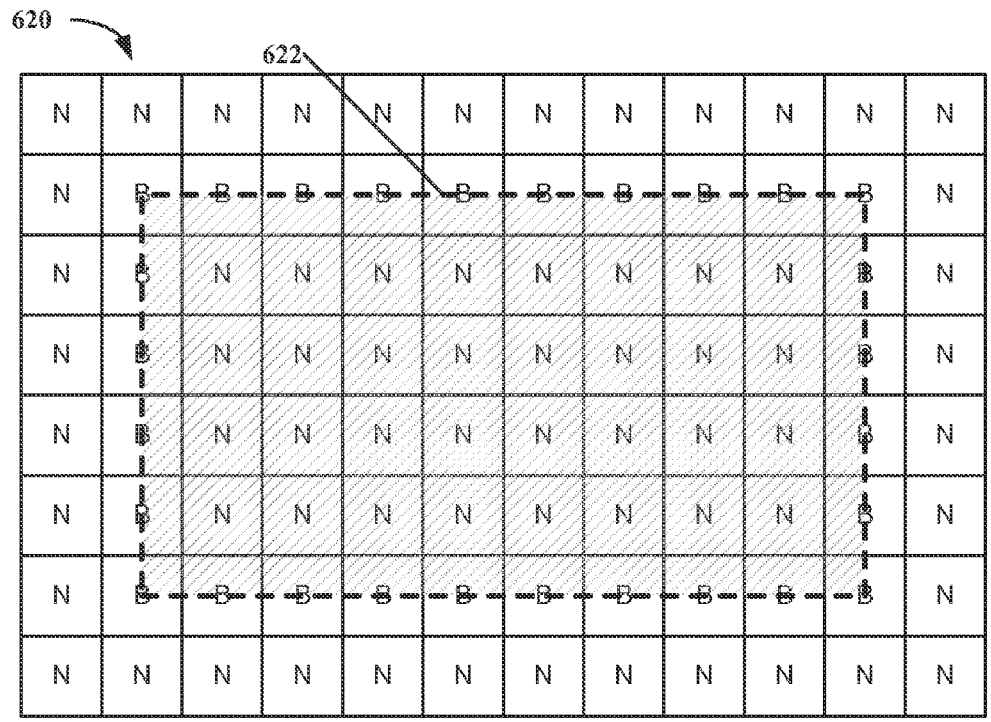
Figure 6C:
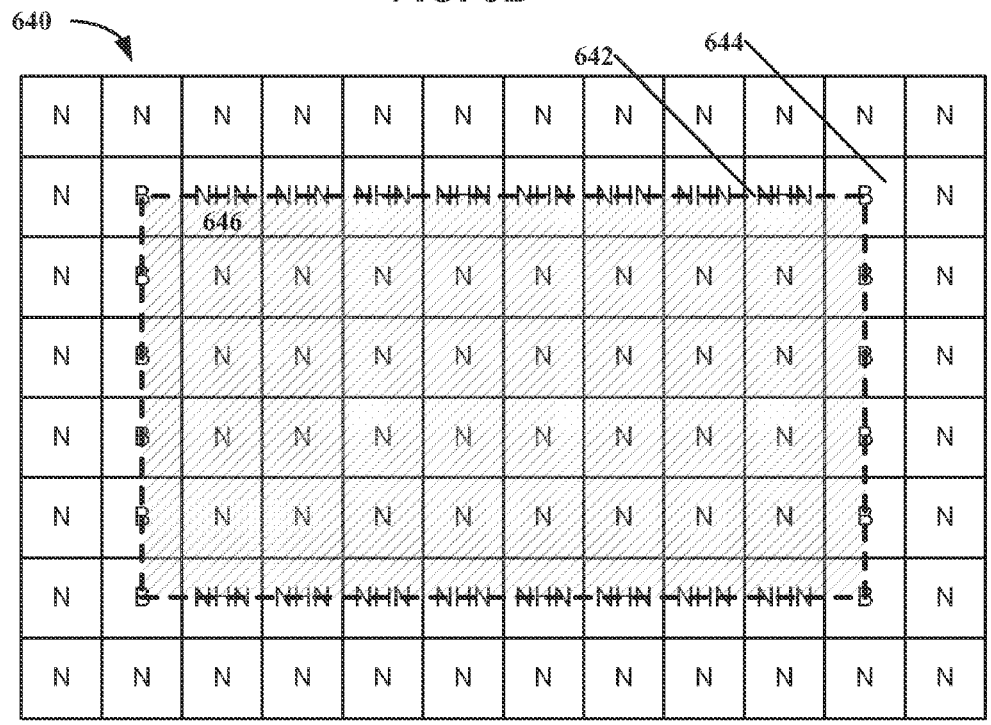

FIGS. 6A-6C illustrate display diagrams of example display screens with a FMV wireframe. A wireframe may be a window border of a window that is displayed while the window is being moved from one location to another location on the display screen. For example, when a FMV window is being moved from Location A to Location B on the display screen, the wireframe of the FMV window is displayed as being moved from Location A to Location B before the contents of the FMV window are displayed at Location B. Referring to FIG. 6A, the display screen 600 may be divided into macro block sets (e.g., macro block set 604) containing four 8-pixel by 8-pixel macro blocks and may include a FMV wireframe 602. The FMV wireframe 602 may be a wireframe outlining a location of a FMV window. The FMV wireframe 602 may be displayed using data from the FMV buffer. The display screen 600 may be displayed using data from the frame buffer.

FIG. 6B illustrates an example of how the macro block sets of the display screen 600 of FIG. 6A may each be represented by two bits of data in a data field of the matrix. For example, the macro block sets of the display screen 620 that do not contain any portion of the FMV wireframe 622 contain non-hue (N) data indicating that the frame buffer may be read for these macro block sets. For the N macro block sets, the corresponding data fields in the matrix may include a two-bit code indicating the non-hue (N) data.

The macro block sets containing the FMV wireframe 622 may consist of both hue and non-hue data (B) indicating that both the FMV buffer and the frame buffer are to be read for these macro block sets. For the B macro block sets, the corresponding data fields in the matrix may include a two-bit code indicating both the hue and non-hue data (B).

FIG. 6C illustrates an example of how the macro block sets of the display screen 600 of FIG. 6A may each be represented by six bits of data in a data field of the matrix. For example, the macro block sets of the display screen 640 that do not contain any portions of the FMV wireframe 642 contain non-hue (N) data indicating that the frame buffer may be read for these macro block sets. For the N macro block sets, the corresponding data fields in the matrix may include a six-bit code indicating the non-hue (N) data.

The macro block sets containing vertical wireframe borders, such as macro block set 644, contain both hue and non-hue data (B), indicating that both the frame buffer and the FMV buffer are to be read for these macro block sets. For the B macro block sets, the corresponding data fields in the matrix may include a six-bit code indicating both the hue and non-hue data (B).

The macro block sets containing horizontal wireframe borders, such as macro block set 646, contain both hue and non-hue data that may be defined based on the hue and non-hue locations within the macro block sets. For example, the FMV wireframe 642 is located in the middle of macro block set 646. The top portion of the macro block set 646 would contain non-hue (N) data. The middle portion of the macro block set 646 would contain hue (H) data (e.g., the location of the wireframe). The bottom portion of the macro block set 646 would contain non-hue (N) data. As such, the data field in the matrix corresponding to the macro block set 646 may include a six-bit code indicating the "NHN" data, which may more accurately define the location of the horizontal wireframe borders.

Figure 7A:
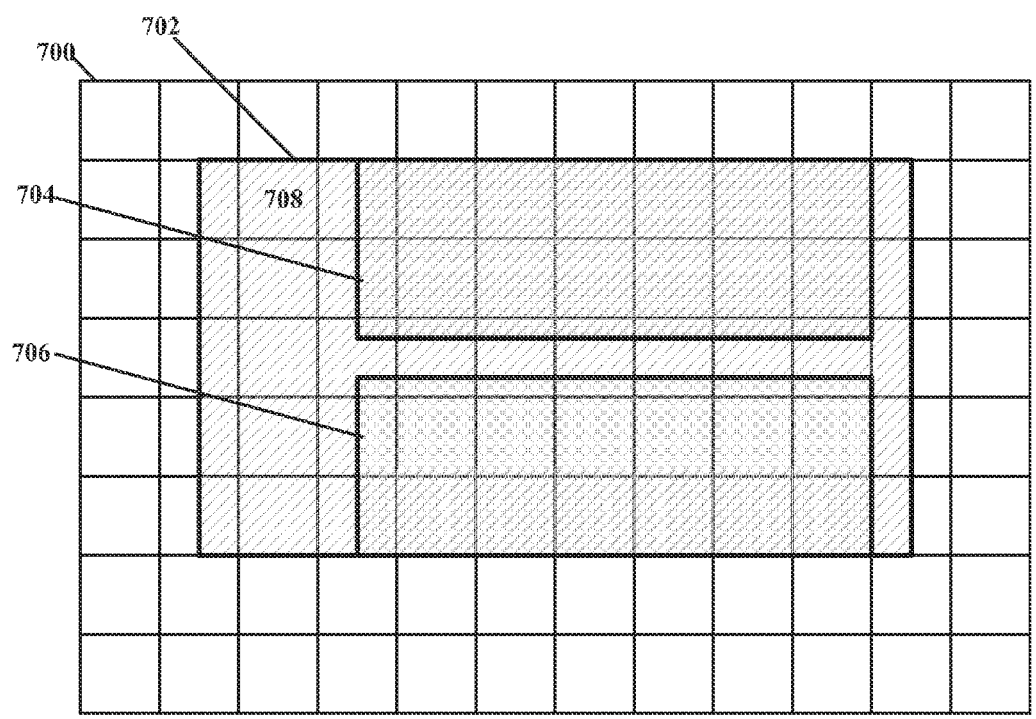
Figures 7B, 7C:
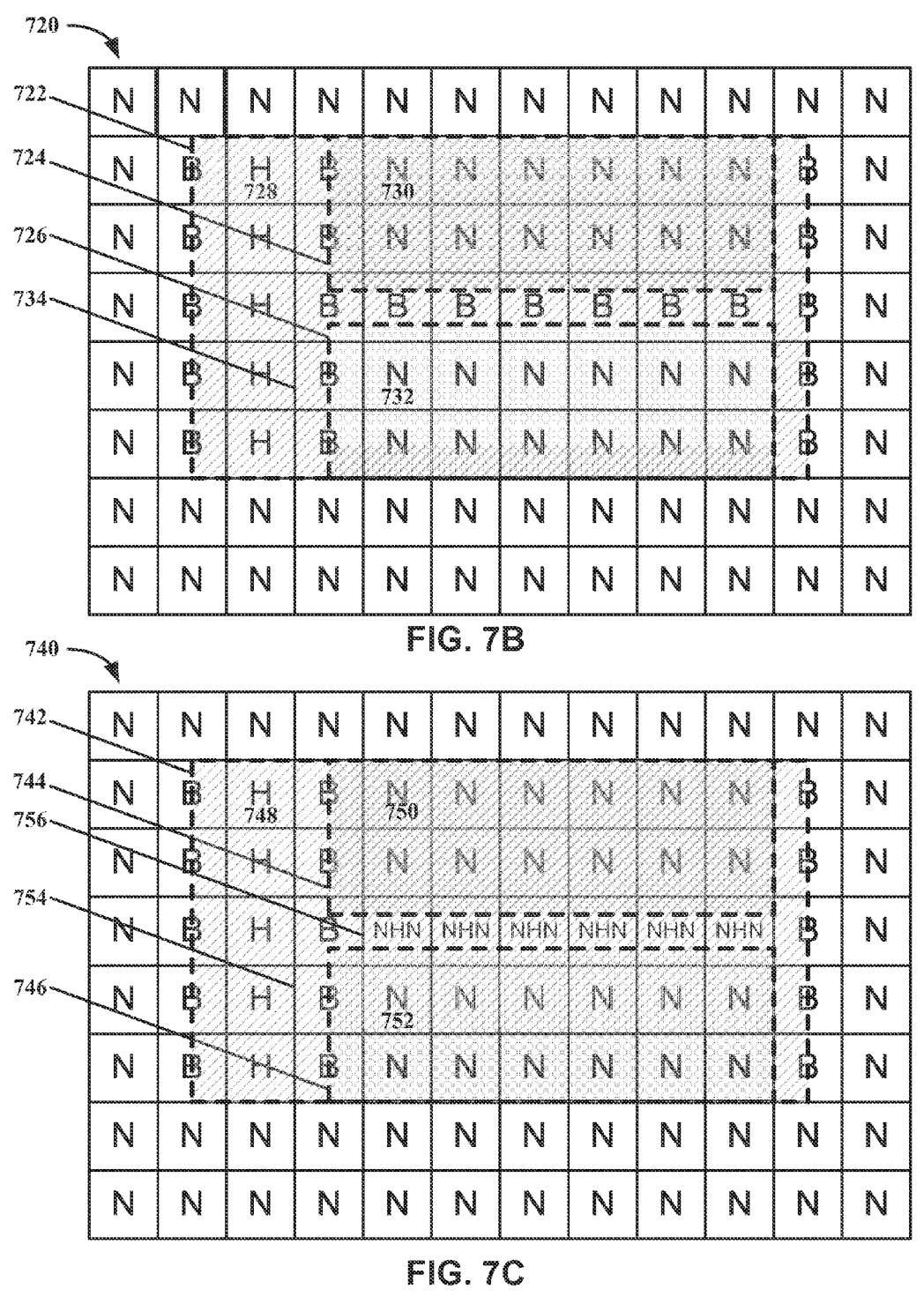

FIGS. 7A-7C illustrate display diagrams of example display screens with a FMV window and two other windows overlaid on top of the FMV window that partially block the view of the FMV window. Referring to FIG. 7A, the display screen 700 may be divided into macro block sets (e.g., macro block set 708) containing four 8-pixel by 8-pixel macro blocks and may include a FMV window 702 for displaying a FMV using data from the FMV buffer and overlay windows 704 and 706 overlaid on top of the FMV window 702. The display screen 700 and the overlay windows 704 and 706 may be windows that are displayed using data from the frame buffer.

FIG. 7B illustrates an example of how the macro block sets of the display screen 700 of FIG. 7A may each be represented by two bits of data in a data field of the matrix. For example, the macro block sets of the display screen 720 that do not contain any portion of the FMV window 722 contain non-hue (N) data indicating that the frame buffer may be read for these macro block sets. For the N macro block sets, the corresponding data fields in the matrix may include a two-bit code indicating the non-hue (N) data. Additionally, for macro block sets that consist entirely of overlay windows 724 and 726 without any FMV, such as macro block sets 730 and 732, the matrix data field corresponding to that macro block set may also include a two-bit code indicating the non-hue (N) data.

The macro block sets within the FMV window 722 consisting entirely of FMV (e.g., macro block set 728) contain hue (H) data indicating that the FMV buffer is to be read for these macro block sets. For the H macro block sets, the corresponding data fields in the matrix may include a two-bit code indicating the hue (H) data.

The macro block sets consisting of both hue and non-hue data (B) (e.g., macro block set 734) are typically macro block sets through which a window border may be found. In these cases, both the frame buffer and the FMV buffer are to be read. For the B macro block sets, the corresponding data fields in the matrix may include a two-bit code indicating both the hue and non-hue (B) data, such as is shown for macro block sets containing the borders of FMV window 722 and the borders for overlay windows 724 and 726 in FIG. 5B.

FIG. 7C illustrates an example of how the macro block sets of the display screen 700 of FIG. 7A may each be represented by six bits of data in a data field of the matrix. For example, the macro block sets of the display screen 740 that do not contain any portions of the FMV window 742 contain non-hue (N) data indicating that the frame buffer may be read for these macro block sets. For the N macro block sets, the corresponding data fields in the matrix may include a six-bit code indicating the non-hue (N) data. Additionally, for macro block sets that consist entirely of overlay windows 744 and 746 without any FMV, such as macro block sets 750 and 752, the matrix data field corresponding to those macro block sets may also include a six-bit code indicating the non-hue (N) data.

The macro block sets within the FMV window 742 consisting entirely of FMV (e.g., macro block set 748) contain hue (H) data indicating that the FMV buffer is to be read for these macro block sets. For the H macro block sets, the corresponding data fields in the matrix may include a six-bit code indicating the hue (H) data.

The macro block sets containing vertical window borders, such as macro block set 754, contain both hue and non-hue data (B) indicating that both the frame buffer and the FMV buffer are to be read for these macro block sets. For the B macro block sets, the corresponding data fields in the matrix may include a six-bit code indicating both the hue and non-hue data (B).

The macro block sets containing horizontal window borders, such as macro block set 756, contain both hue and non-hue data that may be defined based on the hue and non-hue locations within the macro block sets. For example, the bottom horizontal border of overlay window 744 is located one-third down the height of the macro block set 756, and the top horizontal border of overlay window 746 is located two-thirds down the height of the macro block set 756. In this case, the top portion of the macro block set 756 would contain non-hue (N) data. The middle portion of the macro block set 756 would contain hue (H) data. The bottom portion of the macro block set 756 would contain non-hue (N) data. As such, the data field in the matrix corresponding to macro block set 756 may include a six-bit code indicating the "NHN" data, which may more accurately define the location of the horizontal wireframe borders.

FIG. 8 illustrates a table 800 containing an example of macro block states that can be represented by a six-bit matrix code. The six-bit matrix code may represent one of 64 states shown in table 800 for a set of 8-pixel by 8-pixel macro blocks. For example, a particular "HNH" state may be represented by a six-bit matrix code indicating that the first row of pixels in the macro block set is hue, the next six rows of the macro block set are non-hue, and the last row of the macro block set is hue, as shown in state 802 of table 800.

As described above, the matrix contains matrix codes representing states of each macro block set in a frame for display. The matrix is populated with the matrix codes by searching or "sniffing" the frame buffer data when it is read for display and extracting the hue and non-hue information from the frame buffer data. For each macro block set in a frame, the extraction logic interprets the frame buffer data, extracts the hue and non-hue information, and converts the extracted hue and non-hue information into a matrix code representing a hue and non-hue state of each macro block set. The matrix code is written to the matrix.

In some embodiments, when the hue and non-hue information is extracted for the first frame data being processed, the extraction logic may determine the matrix code for all of the macro block sets in the frame. For subsequent frames, the extraction logic may operate more efficiently by sniffing frame buffer data for only the macro block sets that have hue and non-hue data that have changed from the previous frame. To facilitate this selective sniffing, additional indicator bits or "sniff bits" of data may be added to the matrix code for each macro block set to indicate whether the frame buffer data for the macro block set is to be sniffed.

In some circumstances, the matrix may not be updated. For example, if no FMV window is being displayed, an update to the matrix may not be performed. In this case, the matrix may contain matrix codes representing each macro block set being in a non-hue state. In some embodiments, the matrix code in the matrix may be ignored. In other embodiments, the matrix code in the matrix may be checked before reading the frame buffer.

Figure 9A:
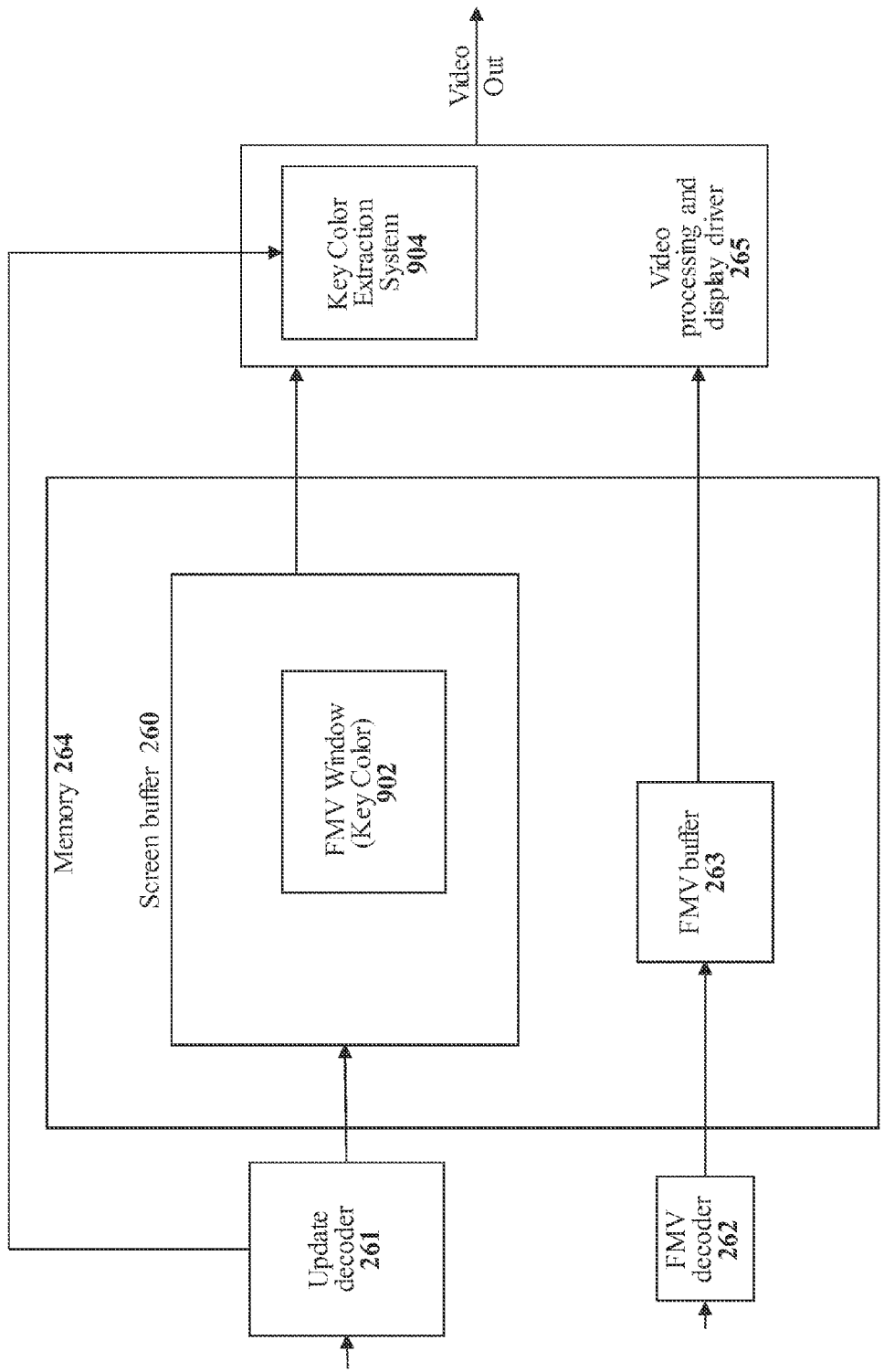
FIGS. 9A-9C illustrate block diagrams of example key color extraction systems, according to some embodiments.
Figure 9B:
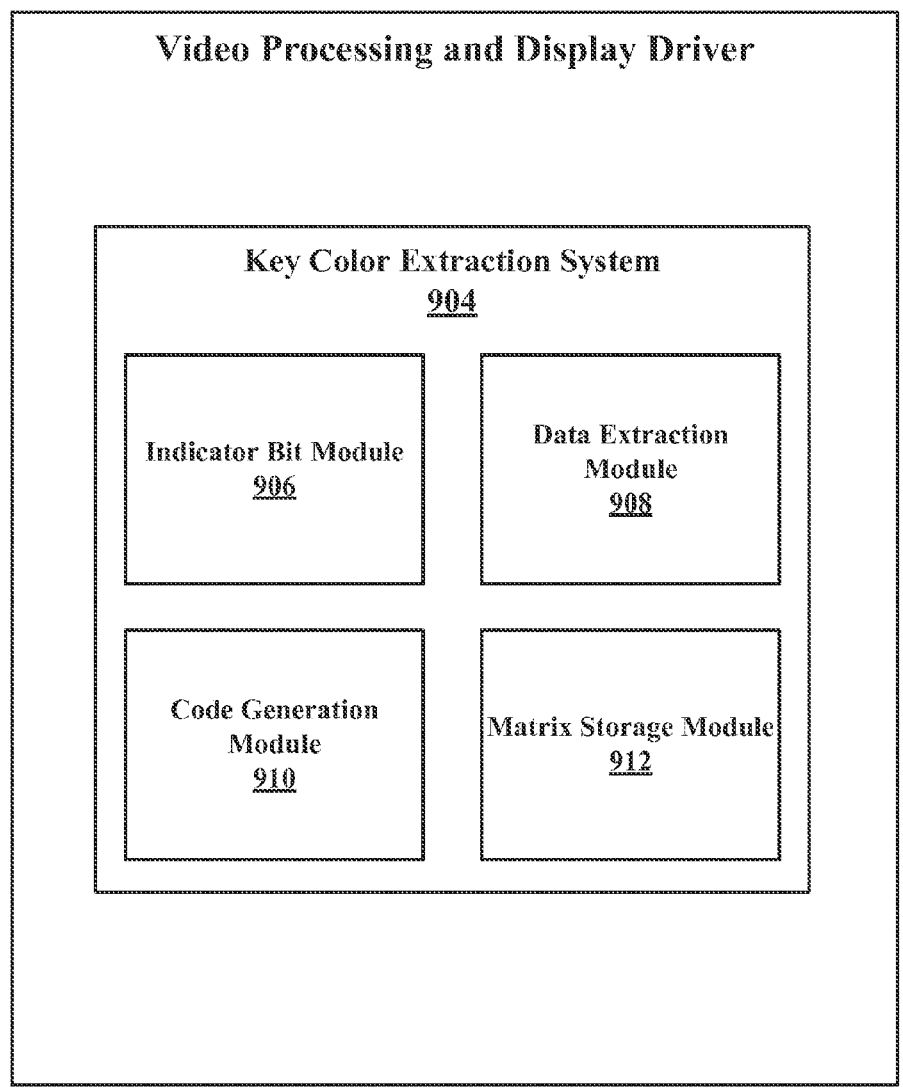
Figure 9C:
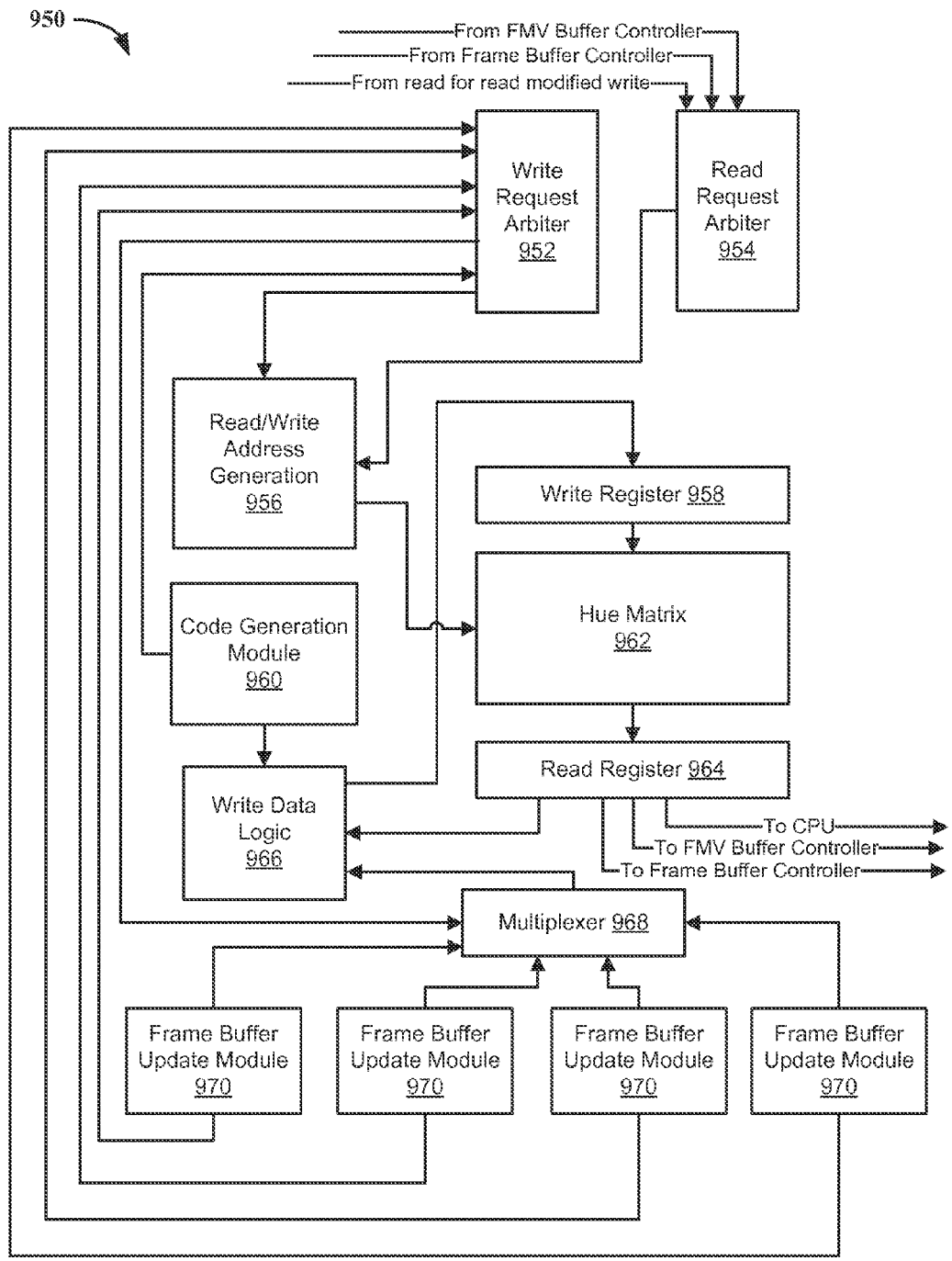

FIGS. 9A-9C illustrate block diagrams of example key color extraction systems. Referring to FIG. 9A, an update decoder 261, such as is similarly shown in FIG. 3, renders a digital representation of a display screen in a frame buffer, such as screen buffer 260, in memory system 264. In an area where a user has opened up a window to display FMV, the update decoder 261 has created a FMV window 902 with a specified key color. In addition to the screen buffer 260 display information, the system also has a FMV decoder 262 that decodes FMV frames into a FMV buffer 263. The FMV frames may be encoded in various different formats. In some embodiments, the decoded FMV consists of video image frames encoded with the "YUV" colorspace. The YUV colorspace encodes pixels with one luminance (Y) component and two chrominance (UV) components in a format that takes into account human perception. In one specific embodiment, the 4:2:0 YUV encoding is employed since the 4:2:0 YUV encoding provides a good quality output with only 1.5 bytes per pixel.

A video output system, such as the video processing and video adapter 265, reads both the desktop display data in the screen buffer 260 and the video frame data in the FMV buffer 263. The key color extraction system 904 of the video processing and video adapter 265 may manage the matrix containing matrix code representing hue and non-hue information for each macro block set in a frame. The video processing and video adapter 265 may read the screen buffer 260 and the FMV buffer 263 according to the matrix to create a composite representation. The composite display data (the combined frame buffer data and FMV data) is then used to generate a final video output signal.

FIG. 9B illustrates a block diagram of the key color extraction system 904 of the video processing and video adapter 265 in greater detail. The key color extraction system 904 may include an indicator bit module 906, a data extraction module 908, a code generation module 910, and a matrix storage module 912.

The indicator bit module 906 of the key color extraction system 904 may manage and control whether the additional indicator bits, or sniff bits, are enabled. The indicator bit module 906 may determine whether hue and non-hue data for a particular macro block set of a frame has changed from the previous frame. For example, in some embodiments, when updates to the frame buffer and the matrix are received, the indicator bit module 906 may determine if a macro block set within the hue matrix has changed from the previous frame, and the indicator bit may be set accordingly. In other embodiments, the indicator bit may not be needed for implementations in which the matrix code may be determined directly by the module that writes updates to the frame buffer, as will be discussed in more detail in the description of FIG. 9C. If the indicator bit module 906 determines a change, the indicator bit module 906 may enable the indicator bits of the matrix code for the particular macro block set so that the hue and non-hue data may be sniffed for that particular macro block set. In some embodiments, the indicator bit module 906 automatically enables the indicator bits for the first frame that is processed, and changes to subsequent frames may then be determined in order to set the indicator bits accordingly.

The data extraction module 908 of the key color extraction system 904 may access and interpret the frame buffer data and extract the hue and non-hue data for macro block sets that have indicator bits that are enabled. As described above, the hue and non-hue data may be extracted by determining whether a particular macro block set contains key color data. If a macro block set contains key color data, the data extraction module 908 may determine that the macro block set contains hue data. If a macro block set does not contain key color data, the data extraction module 908 may determine that the macro block set contains non-hue data.

The code generation module 910 of the key color extraction system 904 may use the hue and non-hue data extracted by the data extraction module 908 to determine the corresponding matrix code. The code generation module 910 may determine the appropriate matrix code for the hue and non-hue data extracted using a code table, similar to the table 800 of FIG. 8. Additionally, when the indicator bit is enabled for a macro block set, the corresponding frame buffer data may be pulled from the frame buffer when the frame buffer is read for display such that the corresponding matrix code for that macro block set may be created.

In some embodiments, the code generation module 910 may use ten bits of data for each macro block set containing four 8-pixel by 8-pixel macro blocks, where each row of the macro block set may be associated with one bit (e.g., B0-B7), one bit (e.g., B8) may be associated with the top four rows of the macro block set (e.g., Group 1), and one bit (e.g., B9) may be associated with the bottom four rows of the macro block set (e.g., Group 2). If any row in Group 1 contains both hue and non-hue data, B8 may be set to 1. If any row in Group 2 contains both hue and non-hue data, B9 may be set to 1. If a particular row of the macro block set contains all hue data, the corresponding bit (e.g., B0-B7) is set to 1. If a particular row of the macro block set contains all non-hue data, the corresponding bit (e.g., B0-B7) is set to 0. Once the hue and non-hue data is collected for each of the eight rows of a macro block set, a look-up table may be used to obtain the corresponding six-bit code. For example, if the eight rows of a macro block set have hue and non-hue data corresponding to "HHH," the corresponding ten bits of data may be "11110000,00." In another example, if the eight rows of a macro block set have hue and non-hue data corresponding to "HN," the corresponding ten bits of data may be "10100000, 10." In yet another example, if the eight rows of a macro block set have hue and non-hue data corresponding to "BBB," the corresponding ten bits of data may be "xxx10000,10." These ten-bit codes may then be used to look up the corresponding six-bit code in the code table. In some embodiments, the code generation module 910 may generate a six-bit code on-the-fly instead of going through the intermediate ten-bit codes.

The matrix storage module 912 of the key color extraction system 904 may manage and store the matrix, including managing and storing the matrix codes for each macro block set of a frame. The matrix storage module 912 may receive the matrix code generated by the code generation module 910 and store the matrix code in the matrix location corresponding to the associated macro block set.

FIG. 9C illustrates a block diagram of a system 950 for populating the hue matrix with hue and non-hue data for a macro block set, which is a more detailed version of the system 904 shown in FIG. 9B. The system 950 may have any suitable number of frame buffer update modules 970, which may be used to write data to the frame buffer. In some embodiments, the frame buffer update module 970 may be a hardware-implemented or software-implemented decompression engine used to decompress incoming frame buffer updates before sending the decompressed updates to the frame buffer. In some embodiments, the frame buffer update module 970 may be a transform engine to process the update (e.g., a bit blit engine, etc.) a decode engine (e.g., JPEG decryption, etc.), and the like. When an update is being processed by one of the frame buffer update modules 970, the hue, non hue, or boundary information extracted from the update is sent to write data logic 966 through the multiplexer 968 based on the write request arbiter 952. The write request arbiter 952 may receive requests from the various frame buffer update modules 970 and may decide to grant access to a particular frame buffer update module 970. The granting of access is used in the multiplexer 968 to select the update data from the chosen frame buffer update module 970 so that the data can be sent to the write data logic 966. Based on the update, the write data logic 966 may then determine the hue matrix code associated with the update or may set the sniff bit accordingly. The code may then be written to the hue matrix 962 through the write register 958 at the appropriate address determined by the read/write address generation module 956.

When a request to read the hue matrix 962 is received by the read request arbiter 954 (e.g., from the FMV buffer, frame buffer, based on a read for read modified write, etc.), the read/write address generation module 956 may determine the address for the location of the data based on the request and provide the address to the hue matrix 962, and the hue matrix 962 may be read through the read register 964.

In some embodiments, the frame buffer update module 970 may be capable of generating the hue matrix code. In this case, the write data module 966 may be used to request that hue matrix code will be written to the hue matrix 962.

Figure 10A:
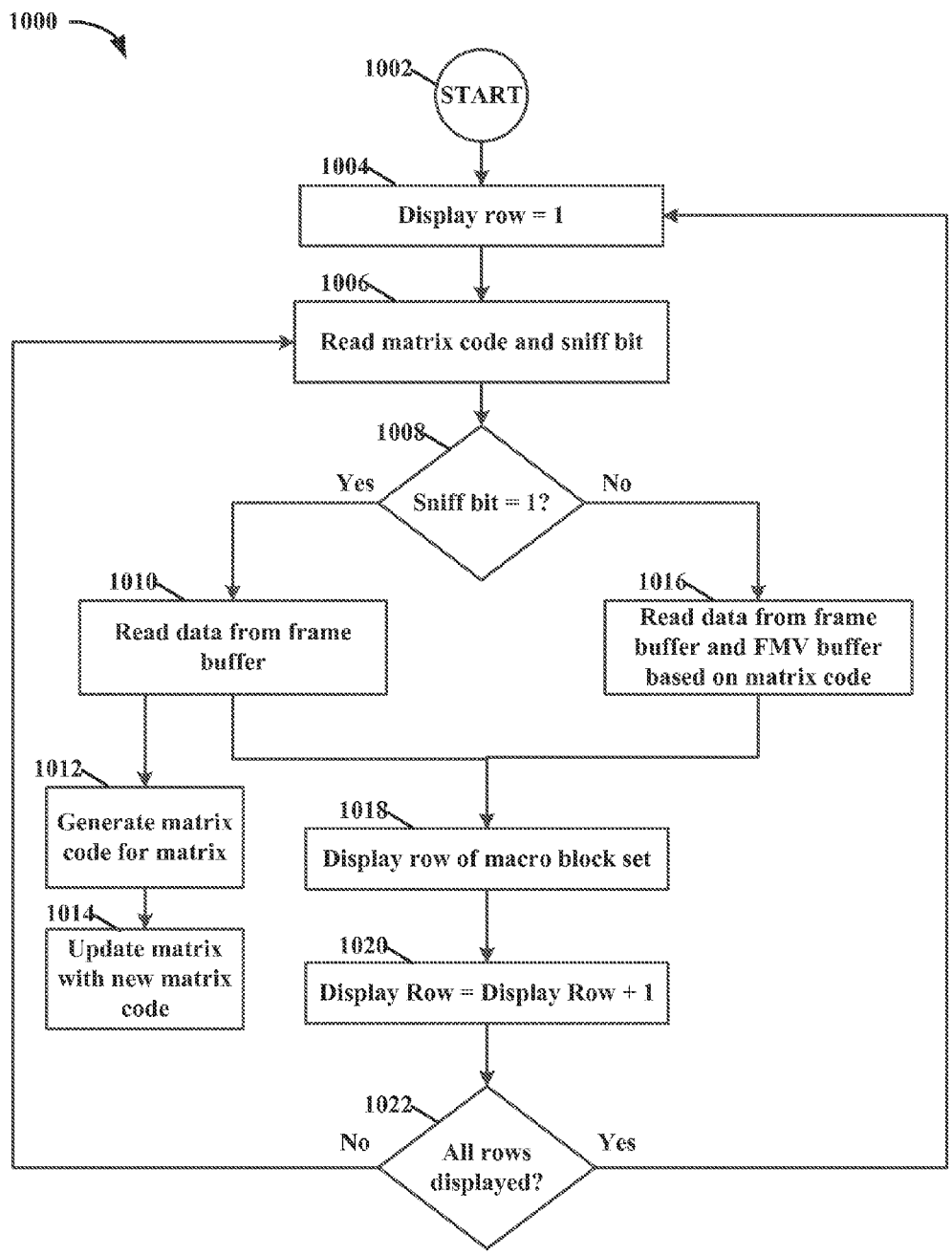
FIGS. 10A-10B illustrate flow charts of example methods of key color extraction, according to some embodiments.
Figure 10B:
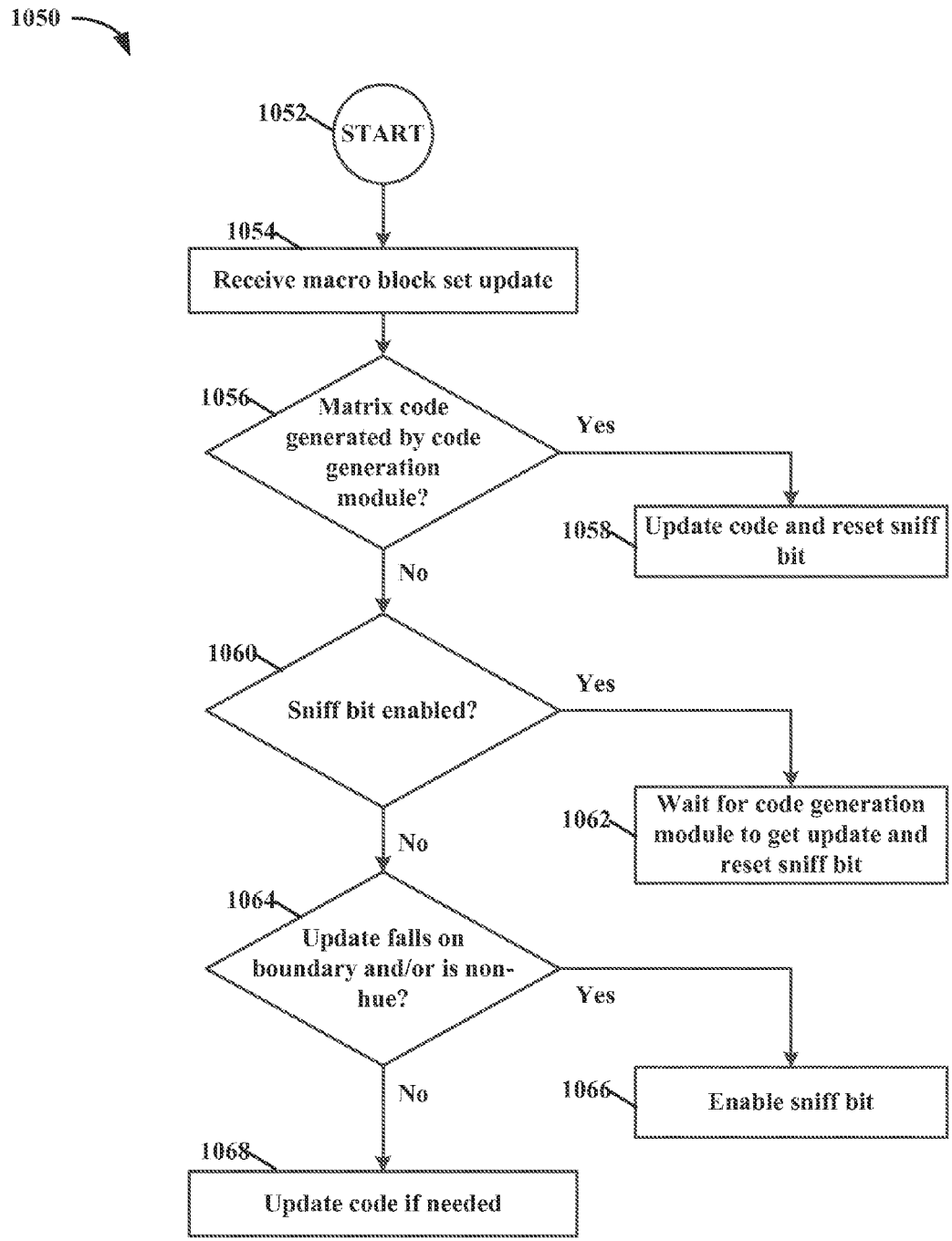

FIGS. 10A-10B illustrate flow charts of example methods of key color extraction. FIG. 10A shows a method 1000 that may be performed by various components of the video processing and video adapter 265 of FIGS. 9A-9B.

In operation 1002, the method 1000 may start the process of reading a macro block set. In operation 1004, the process may begin with the first display row within the macro block set.

In operation 1006, the matrix storage module 912 may retrieve the matrix code associated with the first row of the macro block set and the sniff bit associated with the macro block set.

In operation 1008, the video processing and video adapter 265 may determine whether the sniff bit for the macro block set is enabled (e.g., sniff bit=1).

In operation 1010, if the sniff bit for the macro block set is enabled, the video processing and video adapter 265 may read from the frame buffer to determine the data corresponding to the first row of the macro block set.

In operation 1012, the code generation module 910 may generate the matrix code for the matrix based on the data read from the frame buffer in operation 1010.

In operation 1014, the code generation module 910 may update the matrix with the new matrix code that was generated in operation 1012.

In operation 1016, if the sniff bit for the macro block set is not enabled (e.g., sniff bit=0), the video processing and video adapter 265 may read the frame buffer and the FMV buffer according to the matrix code. For example, if the matrix indicates that a particular row of the macro block set contains hue data, the video processing and video adapter 265 may read the FMV buffer accordingly, and if the matrix indicates a particular macro block set contains non-hue data, the video processing and video adapter 265 may read the frame buffer accordingly.

In operation 1018, the video processing and video adapter 265 may use the data read from the frame buffer in operation 1010 or the data read from the frame buffer and the FMV buffer in operation 1016 to display the row of the macro block set. This may include filing up the display pipeline with the data to be used for displaying the row of the macro block set.

In some embodiments, reading the frame buffer and/or the FMV buffer includes repurposing the frame buffer data and/or the FMV buffer data to determine the final display form. Repurposing the data may include accounting for considerations such as aligning the macro block boundaries of the FMV window to the macro block pixel boundaries of the frame buffer display screen, accounting for a FMV window that has been resized from its native size, and the like.

In operation 1020, the display row may be incremented to the next row in the macro block set. In operation 1022, the video processing and video adapter 265 may determine whether all rows within the macro block set have been displayed. If all rows of the macro block set have not yet been displayed, the process may begin again at operation 1006 for the next row in the macro block set. If all rows of the macro block set have been displayed, the process may begin again at operation 1004 for the next macro block set to be processed. One of ordinary skill in the art will appreciate that operations 1012 and 1014 may be performed in parallel to operations 1018, 1020, and 1022.

FIG. 10B shows a method 1050 for updating the matrix with matrix code for a macro block set. In operation 1052, the method 1050 may begin the process of updating the matrix code. In operation 1054, a frame buffer update module 970 of FIG. 9C may receive a macro block set update.

In operation 1056, the video processing and video adapter 265 may determine whether the matrix code is to be generated by the code generation module 960 of FIG. 9C or if the matrix code may be generated by the frame buffer update module 970. If the matrix code is to be generated by the code generation module 960, in operation 1058, the code may be updated if the sniff bit associated with the macro block set is set, and the sniff bit may be reset such that it is disabled (e.g., sniff bit=0).

In operation 1060, while reading the hue matrix, if the sniff bit is set and the update is not from the code generation module, no changes are made to the matrix code or the sniff bit. In operation 1062, only the code generation module may update the code once the sniff bit has been set. The request for update from a frame buffer update module 970 that is different than the code generation logic will be in a waiting state by issuing a busy signal until the sniff bit is reset.

If the sniff bit is not enabled, in operation 1064, write data logic 966 may determine whether the update falls on a boundary and/or if the update contains non-hue data. If the update falls on a boundary, and/or if the update contains non-hue data, in operation 1066, the sniff bit is enabled. If the update does not fall on a boundary and the update does not contain non-hue data, the code is updated if needed in operation 1068.

When the hue matrix is to be updated, the updating may be performed by the frame buffer update module 970 (e.g., bit blit, JPEG decode engine, decompression engine, etc.), or by the data extraction module 908. In some embodiments, if the sniff bit has been enabled, the frame buffer update module 970 may not be able to update the corresponding hue matrix code until the sniff bit is reset such that it is no longer enabled. In some embodiments, the hue matrix code may be updated by the frame buffer update module 970 if all of the macro block sets contain hue data. In some embodiments, for macro block sets containing all non-hue data or both hue and non-hue data, only the sniff bits are enabled by the frame buffer update module 970 in conjunction with write data logic module 966 and the hue matrix code may be set by the code generation module 960 in conjunction with write data logic module 966. In some embodiments, when the frame buffer reads a row from memory, it may also pre-read the corresponding row in the hue matrix. If the sniff bit is set for any macro block set, the code generation module 960 may generate the matrix code and reset the sniff bit.

When setting the sniff bit, in some embodiments, the sniff bit may be enabled at the outset in order to obtain the hue and non-hue data from the frame buffer updates. In some embodiments, the sniff bit may be enabled for a macro block set, which may imply that only the frame buffer is to be read for the corresponding macro block set. However, in other embodiments, for example in special cases like the fast moving decompressed display data overlapping FMV, both the frame buffer and the FMV buffer may be read. In some embodiments, the sniff bits may be set by the hue matrix logic and reset by the code generation module 960 in conjunction with write data logic 966. In some embodiments, if a macro block set contains at least macro block that is non-hue, the corresponding sniff bit may be enabled. If the updated macro block is a hue macro block, but the other macro blocks in the macro block set are non-hue, the sniff bit may be enabled. If the updated macro block is a hue macro block, and the other macro blocks in the macro block set are hue, the corresponding sniff bit may be reset, and the matrix code may indicate that the macro block set contains all hue data. Once the frame buffer updates the hue and/or boundary code, the corresponding sniff bit may be reset. In some embodiments, if a sniff bit has been set, the corresponding matrix code may not be updated by the frame buffer update module 970 until the frame buffer resets the sniff bit.

In some embodiments, the frame buffer data in the frame buffer may be updated by thin-client terminal system components such as decompression logic, data transfer and conversion engines like Bit-BLock Image Transfer (Bit BLIT), direct CPU/direct memory access (DMA) writes, and the like. The engines updating the frame buffer may simultaneously update the matrix to maintain a representation of the frame buffer. In some embodiments, a CPU write path may also be provided to update the matrix.

In some embodiments, non-FMV fast-changing decompression may occur using any suitable techniques. A boundary for a non-FMV fast-changing window may be identified using a row register and a column register for the matrix. For example, one bit of the row register may identify a row of the matrix, and one bit of the column register may identify a macro block set. The row register and column register bits may be populated by any suitable fast-changing logic. If a non-FMV fast-changing window overlaps with a FMV window, and the macro block sets of the non-FMV fast-changing window are not aligned with the macro block sets of the FMV window, it may be possible that the macro block sets along the boundary of the non-FMV fast-changing window may be part hue and part non-hue. Since these windows are fast-changing, the data decompression for these windows may be up to, for example, 30 frames per second. This may mean that the sniff bit is to be set at the same rate as the non-FMV fast-changing window (e.g., 30 frames per second). Reading the frame buffer data for the non-FMV fast-changing window at this rate may cause a continuous flash of dummy data instead of steady movie data. To resolve this, when a boundary is ascertained between hue and non-hue data for non-FMV fast-changing decompression and the sniff bit is set, both the frame buffer and the FMV buffer data may be read at the boundary. However, while this may resolve issues regarding continuous flashes of dummy data, this may cause peak bandwidth issues.

To resolve the issues regarding continuous flashes of key color and peak bandwidth, a hybrid approach to reading data at the boundary of a non-FMV fast-changing window may be used. When a non-FMV fast-changing window boundary is identified, the sniff bits may be enabled such that the entire boundary area is read for the first frame. The hue and non-hue data may be extracted based on the sniff bits to generate the corresponding matrix code, which may be used to populate the matrix. For the next frames, the matrix code may be used to determine how to read the frame buffer data for the boundary of the non-FMV fast-changing window regardless of the sniff bits for the boundary. The hue row along the boundary of the non-FMV fast-changing window may be read from the frame buffer data to determine whether that hue row has changed. This row will be read from the FMV buffer and also sniffed from the frame buffer. If the hue row has changed to a non-hue row, the frame buffer data for the next frame will be sniffed for the entire macro block set to determine the new matrix code. If the hue row on the boundary has not changed, data for the entire macro block row will not be sniffed for the next frame and only the frame buffer data for the hue row on the boundary will be sniffed again. The non-hue row on the boundary, which may be read by default from the frame buffer, may also be checked for transition to all hue. If this non-hue row has changed to a hue row, the frame buffer data for the next frame may be sniffed for the entire macro block set to determine the new matrix code. This technique allows for more efficient reading of the frame buffer data for macro block sets containing a boundary of a non-FMV fast-changing window by limiting the rows read by both the frame buffer and the FMV buffer to only one row (e.g., the hue row at the boundary), instead of reading both the frame buffer and the FMV buffer for all 8 rows of the macro block set.

Figures 11A, 11B:
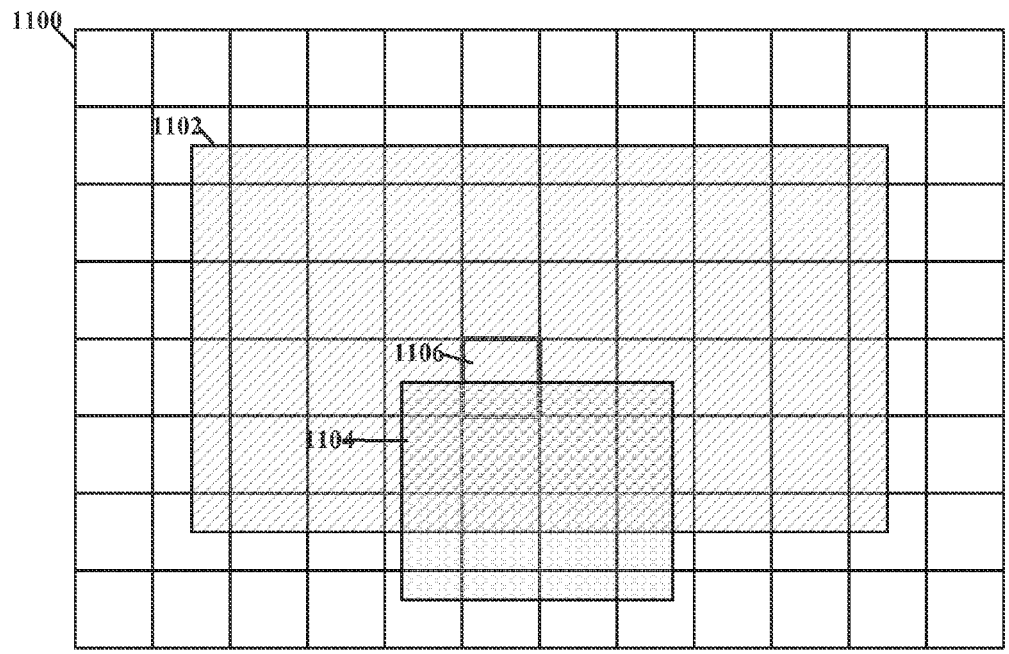
FIGS. 11A-11B illustrate display diagrams of example display screens with a full-motion video window and a non-full-motion video (FMV) fast-changing window overlaid on top of the full-motion video window that partially blocks the view of the full-motion video window, according to some embodiments.

FIGS. 11A-11B illustrate display diagrams of an example display screen 1100 with a FMV window 1102 and a non-FMV fast-changing window 1104 overlaid on top of the FMV window 1102 that partially blocks the view of the FMV window 1102. For a macro block set containing a boundary of the non-FMV fast-changing window 1104, such as macro block set 1106, the frame buffer data may be read according to the hybrid approach described above.

Referring to FIG. 11B, the macro block set 1106 may contain the top horizontal boundary of the non-FMV fast-changing window 1104 at pixel row 1110. For a first frame, the horizontal boundary may be determined to be at pixel row 1110 when the frame buffer data is sniffed according to the sniff bits being automatically enabled for the macro block sets of the first frame.

For the next frame, it is possible that the hue area may be reduced or expanded. To accommodate this, the pixel row 1110 in the macro block set 1106 may be sniffed to determine if any changes to the hue data of pixel row 1110. If the pixel row 1110 is now non-hue data, the entire macro block set 1106 will be read from the frame buffer data for the next frame.

In some embodiments, the matrix data field corresponding to the FMV window is read starting from the macro block set that corresponds to the FMV window coordinates. If the macro blocks of the FMV window are not aligned with the macro blocks of the frame buffer display screen, the macro block sets for the FMV window are decoded and the value of the correct row and column are chosen as the starting point for reading the FMV buffer. If the FMV window has been resized, the FMV window may first be resized to the native size before reading the FMV buffer. For example, for a FMV window that has been horizontally resized down, after a matrix row for the FMV window is decoded, the matrix row is resized down by dropping bits of data in the matrix, and the resized-down values are used to determine what FMV buffer data to pull. For a FMV window that has been vertically resized down, since each matrix code value represents the eight rows for a macro block set, once the code is decoded, the information about the rows for that macro block set is retrieved, and the row information will be resized down by dropping bits of data in the matrix. The residual information may be used to determine what rows for a macro block set will be pulled from the FMV buffer.

In one embodiment, explicit window coordinates may be received from the thin-client server computer system 220 when hue color is not present in the frame buffer. In this case, rectangle information may be sent by the thin-client server computer system 220, and the hue matrix may be updated with hue and non-hue data based on the coordinates of the rectangle. In this case, decompression using the CPU may be used to update the hue matrix to reflect overlay windows when specified. In other embodiments, the hue data may be extracted from the alpha channel when a 32-bit alpha-RGB (ARGB) format is used. In this case, the hue matrix may be updated directly using the extracted hue information.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method, comprising:
receiving an update corresponding to a portion of a digital representation of a display screen;
identifying, within the update, at least one of:
one or more locations having key color data, the key color data indicating a location of a full-motion video window, and
one or more locations without key color data;
determining a data structure code associated with the portion of the digital representation of the display screen, the determining based on at least one of the one or more locations having key color data and the one or more locations without key color data;
providing the data structure code to a data structure;
identifying a boundary of a fast-changing window overlaid over the full-motion video window;
scanning a frame buffer along the boundary for display, the frame buffer being capable of being read according to the data structure during the scan of a frame buffer;
determining whether a change to a pixel row adjacent to the boundary has occurred; and
based on the change having occurred, determining a new data structure code associated with the portion of the digital representation of the display screen.

2. The method of claim 1, wherein the update corresponds to one or more macro blocks of a frame corresponding to the digital representation of the display screen.

3. The method of claim 2, further comprising:
identifying, within the one or more macro blocks in the frame, a row of pixels having a window boundary.

4. The method of claim 3, further comprising:
identifying whether the one or more macro blocks includes all key color data, all non-key color data, or a combination of key color data and non-key color data.

5. The method of claim 4, wherein determining the data structure code comprises:
if the one or more macro blocks includes all key color data or non-key color data, determining that the one or more macro blocks includes a window boundary; and
if the one or more macro blocks includes the combination of key color data and non-key color data, determining that the one or more macro blocks includes at least one of a wire frame, a window corner, an adjacent window, a fuzzy window, and a partial fuzzy window.

6. The method of claim 1, wherein the identifying is performed during the scan of the frame buffer for display and is based on an indicator stored in a portion of the data structure corresponding to the portion of the digital representation of the display screen.

7. The method of claim 6, wherein the indicator is reset after the identifying is performed.

8. The method of claim 1, wherein the update is received at the frame buffer from a frame buffer update module.

9. The method of claim 8, wherein the frame buffer update module is a decode engine or a transform engine.

10. The method of claim 8, wherein the identifying is performed by the frame buffer update module.

11. The method of claim 1, further comprising:
accessing the data structure code;
decoding the data structure code; and
using the decoded data structure code in response to a resizing of the full-motion video window.

12. The method of claim 1, further comprising:
accessing the data structure code;
decoding the data structure code; and
using the decoded data structure code in response to the full-motion video window being unaligned.

13. The method of claim 1, wherein the identifying is performed based on the update being received through an alpha channel having alpha-RGB data.

14. The method of claim 1, wherein the update includes window coordinates and wherein the identifying is based on the window coordinates.

15. The method of claim 1, wherein a full-motion video buffer is capable of being read according to the data structure.

16. A system comprising:
a hardware-implemented frame buffer update module configured to receive an update corresponding to a portion of a digital representation of a display screen,
wherein the system is further configured to:
identify, within the update, at least one of: one or more locations having key color data, the key color data indicating a location of a full-motion video window, and one or more locations without key color data; and
determine a data structure code associated with the portion of the digital representation of the display screen, the determining based on the identifying of the at least one of the one or more locations having key color data and the one or more locations without key color data;
identify a boundary of a fast-changing window overlaid over the full-motion video window;
scan a frame buffer along the boundary for display, the frame buffer being capable of being read according to the data structure during the scan of the frame buffer;
determine whether a change to a pixel row adjacent to the boundary has occurred; and
based on the change having occurred, determine a new data structure code associated with the portion of the digital representation of the display screen; and
a hardware-implemented data structure storage module configured to provide the data structure code to a data structure.

17. The system of claim 16, wherein the update corresponds to one or more macro blocks of a frame corresponding to the digital representation of the display screen.

18. The system of claim 17, wherein the hardware-implemented frame buffer update module is further configured to:
identifying, within the one or more macro blocks in the frame, a row of pixels having a window boundary.

19. The system of claim 18, wherein the one or more macro blocks includes all key color data, all non-key color data, or a combination of key color data and non-key color data.

20. The system of claim 19, wherein the system is further configured to:
if the one or more macro blocks includes all key color data or non-key color data, determine that the one or more macro blocks includes a window boundary; and
if the one or more macro blocks includes the combination of key color data and non-key color data, determine that the one or more macro blocks includes at least one of a wire frame, a window corner, an adjacent window, a fuzzy window, and a partial fuzzy window.

21. The system of claim 16, further comprising:
a hardware-implemented code generation module configured to perform the identifying during the scan of the frame buffer for display, the identifying being performed based on an indicator stored in a portion of the data structure corresponding to the portion of the digital representation of the display screen.

22. The system of claim 21, wherein the indicator is reset after the identifying is performed.

23. The system of claim 16, wherein the hardware-implemented frame buffer update module is a decompression engine.

24. The system of claim 16, wherein the frame buffer update module is a decode engine or a transform engine.

25. The system of claim 16, wherein the identifying is performed by the frame buffer update module.

26. The system of claim 16, further comprising:
a hardware-implemented full-motion video controller configured to:
access the data structure code;
decode the data structure code; and
use the decoded data structure code in response to a resizing of the full-motion video window.

27. The system of claim 16, further comprising:
a hardware-implemented full-motion video controller configured to:
access the data structure code;
decode the data structure code; and
use the decoded data structure code in response to the full-motion video window being unaligned.

28. The system of claim 16, wherein the identifying is performed based on the update being received through an alpha channel having alpha-RGB data.

29. The system of claim 16, wherein the update includes window coordinates and wherein the identifying is based on the window coordinates.

30. The system of claim 16, wherein a full-motion video buffer is capable of being read according to the data structure.

31. A non-transitory machine-readable storage medium storing instructions which, when executed by one or more processors, cause the one or more processors to perform operations, comprising:
receiving an update corresponding to a portion of a digital representation of a display screen;
identifying, within the update, at least one of:
one or more locations having key color data, the key color data indicating a location of a full-motion video window, and
one or more locations without key color data;
determining a data structure code associated with the portion of the digital representation of the display screen, the determining based at least one of the one or more locations having key color data and the one or more locations without key color data;
providing the data structure code to a data structure;
identifying a boundary of a fast-changing window overlaid over the full-motion video window;
scanning a frame buffer along the boundary for display,
the frame buffer being capable of being read according to the data structure during the scan of a frame buffer;
determining whether a change to a pixel row adjacent to the boundary has occurred; and
based on the change having occurred, determining a new data structure code associated with the portion of the digital representation of the display screen.

32. A system, comprising:
means for receiving an update corresponding to a portion of a digital representation of a display screen;
means for identifying, within the update, at least one of:
  one or more locations having key color data, the key color data indicating a location of a full-motion video window, and
  one or more locations without key color data;
means for determining a data structure code associated with the portion of the digital representation of the display screen, the determining based on at least one of the one or more locations having key color data and the one or more locations without key color data;
means for providing the data structure code to a data structure;
means for identifying a boundary of a fast-changing window overlaid over the full-motion video window;
means for scanning a frame buffer along the boundary for display,
  the frame buffer being capable of being read according to the data structure during the scan of a frame buffer;
  means for determining whether a change to a pixel row adjacent to the boundary has occurred; and
means for determining a new data structure code associated with the portion of the digital representation of the display screen, the determining based on the change having occurred.

* * * * *